United States Patent
Zhou et al.

(10) Patent No.: US 12,306,400 B2
(45) Date of Patent: May 20, 2025

(54) GLASSES HAVING WIRELESS CHARGING RECEIVER CIRCUIT, GLASSES CASE FOR GLASSES, AND SYSTEM

(71) Applicant: HUAWEI TECHNOLOGIES CO., LTD., Shenzhen (CN)

(72) Inventors: Guoming Zhou, Shenzhen (CN); Qiyun Yuan, Shanghai (CN); Tong Zhang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 855 days.

(21) Appl. No.: 17/436,318

(22) PCT Filed: Mar. 14, 2020

(86) PCT No.: PCT/CN2020/079391
§ 371 (c)(1),
(2) Date: Sep. 3, 2021

(87) PCT Pub. No.: WO2020/192459
PCT Pub. Date: Oct. 1, 2020

(65) Prior Publication Data
US 2022/0179213 A1   Jun. 9, 2022

(30) Foreign Application Priority Data
Mar. 25, 2019 (CN) .......................... 201910229664.8

(51) Int. Cl.
*G02B 27/01* (2006.01)
*H02J 50/10* (2016.01)
(Continued)

(52) U.S. Cl.
CPC .......... *G02B 27/0172* (2013.01); *H02J 50/10* (2016.02); *H02J 50/80* (2016.02); *H02J 50/90* (2016.02); *H02J 2310/22* (2020.01)

(58) Field of Classification Search
CPC .. H02J 50/10; H02J 50/80; H02J 50/90; H02J 2310/22
See application file for complete search history.

(56) References Cited

U.S. PATENT DOCUMENTS

| 2005/0078481 A1 | 4/2005 | Hanis et al. |
| 2012/0062173 A1 | 3/2012 | Choi et al. |
| | (Continued) | |

FOREIGN PATENT DOCUMENTS

| CN | 203491750 U | 3/2014 |
| CN | 105700197 A | 6/2016 |
| | (Continued) | |

OTHER PUBLICATIONS

Anonymous: "Reset (computing)" Wikipedia, Dec. 14, 2018 (Dec. 14, 2018), XP093151251; Retrieved from the Internet: URL:https://web.archive.org/web/20181214023351/https://en.wikipedia.org/wiki/Reset_(computing)[retrieved on Apr. 12, 2024]; 2 total pages.

*Primary Examiner* — David V Henze-Gongola
(74) *Attorney, Agent, or Firm* — Rimon PC

(57) ABSTRACT

This application discloses a pair of glasses having a wireless charging receiver circuit, a glasses case for glasses, and a system, and relates to the field of terminal technologies. The glasses may automatically perform hardware reset without disposing a reset button. The glasses case includes a housing having a cavity configured to accommodate the glasses, a processor, and a wireless charging transmitter circuit coupled to the wireless charging receiver circuit. The processor is configured to determine that the glasses need to perform power-on reset; and the wireless charging transmitter circuit is configured to send a first signal to the glasses in response to a case in which the processor determines that the glasses need to perform power-on reset, to trigger at least one processor of the glasses to perform power-on reset.

20 Claims, 11 Drawing Sheets

(51) Int. Cl.
*H02J 50/80* (2016.01)
*H02J 50/90* (2016.01)

(56) References Cited

U.S. PATENT DOCUMENTS

| | | | |
|---|---|---|---|
| 2016/0087480 A1* | 3/2016 | Trudeau | G06F 1/24 |
| | | | 320/108 |
| 2017/0064429 A1 | 3/2017 | Hirsch et al. | |
| 2018/0090958 A1 | 3/2018 | Steger et al. | |
| 2018/0136492 A1 | 5/2018 | An et al. | |
| 2019/0033622 A1* | 1/2019 | Olgun | H04B 5/24 |
| 2019/0140466 A1* | 5/2019 | Zhang | H02J 7/0068 |
| 2019/0179172 A1* | 6/2019 | Schoutens | G02C 7/10 |

FOREIGN PATENT DOCUMENTS

| | | |
|---|---|---|
| CN | 106646925 A | 5/2017 |
| CN | 107710056 A | 2/2018 |
| CN | 107925258 A | 4/2018 |
| CN | 108604830 A | 9/2018 |
| CN | 109375497 A | 2/2019 |
| CN | 110007487 A | 7/2019 |
| CN | 210323647 U | 4/2020 |
| KR | 20120026789 A | 3/2012 |
| KR | 20160141586 A | 12/2016 |
| KR | 20180060014 A | 6/2018 |
| WO | 2018058130 A1 | 3/2018 |

\* cited by examiner

GLASSES HAVING WIRELESS CHARGING RECEIVER CIRCUIT, GLASSES CASE FOR GLASSES, AND SYSTEM

This application is a National Stage of International Application No. PCT/CN2020/079391, filed on Mar. 14, 2020, which claims priority to Chinese Patent Application No. 201910229664.8, filed with the China National Intellectual Property Administration on Mar. 25, 2019, entitled "GLASSES HAVING WIRELESS CHARGING RECEIVER CIRCUIT, GLASSES CASE FOR GLASSES, AND SYSTEM", both of which are incorporated herein by reference in its entirety.

TECHNICAL FIELD

Embodiments of this application relate to the field of terminal technologies, and in particular, to glasses having a wireless charging receiver circuit, a glasses case for glasses, and a system.

BACKGROUND

A wearable device is a portable device that may be worn on a body, a shoe or clothing, or another accessory of a user. For example, wearable devices may include a wrist-supported watch-type device (for example, a smart watch or a smart band), a head-supported glass-type device (for example, smart glasses, a smart helmet, or a smart headband), and the like.

The smart glasses are used as an example. In a process of use, there may be a problem that a chip (for example, a Bluetooth chip) of the glasses runs unsteadily. In this case, hardware reset may be performed on the glasses, to avoid a case in which the glasses cannot be normally used due to unstable running of the chip. In some solutions, a reset button may be disposed on the glasses. A user may operate the reset button, to control the glasses to perform hardware reset.

However, in the solutions, the user can control the glasses to perform hardware reset only by manually operating the reset button, and the glasses cannot automatically perform hardware reset. Consequently, the user has a relatively poor use experience. In addition, disposing the reset button on the glasses may further destroy an aesthetic appearance of the glasses.

SUMMARY

Embodiments of this application provide a pair of glasses having a wireless charging receiver circuit, a glasses case for glasses, and a system. The glasses may automatically perform hardware reset without disposing a reset button.

According to a first aspect, an embodiment of this application provides a glasses case for glasses having a wireless charging receiver circuit. The glasses case includes a housing, a processor, and a wireless charging transmitter circuit. The housing has a cavity configured to accommodate the glasses. The processor is configured to determine that the glasses need to perform power-on reset. The wireless charging transmitter circuit is coupled to the wireless charging receiver circuit of the glasses. The wireless charging transmitter circuit is configured to send a first signal to the glasses in response to a case in which the processor determines that the glasses need to perform power-on reset, to trigger at least one processor of the glasses to perform power-on reset.

In this embodiment of this application, in response to determining that the glasses need to perform power-on reset, the glasses case may send the first signal to the glasses, to trigger the processor of the glasses to perform power-on reset. In other words, the glasses may automatically perform hardware reset without disposing a reset button.

With reference to the first aspect, in a possible design manner, the glasses case further includes a reset button. When a user wants to control the glasses (for example, the processor of the glasses) to perform hardware reset, the glasses may be placed in the glasses case or near the glasses case, so that a distance between the glasses case and the glasses is less than a preset distance threshold. Then, the user may tap the reset button. The processor may detect a user input acting on the reset button. In response to an input signal received from the reset button, the processor may determine that the glasses need to perform power-on reset.

With reference to the first aspect, in another possible design manner, the glasses case further includes a transceiver. The transceiver of the glasses case is configured to receive a reset request message sent by the glasses. The reset request message is used to request to perform power-on reset on the glasses. The processor determines, based on the reset request message received by the transceiver, that the glasses need to perform power-on reset. The glasses may send the reset request message to the glasses case (for example, the transceiver of the glasses case) when the processor of the glasses is faulty.

With reference to the first aspect, in another possible design manner, the glasses case further includes a transceiver. The processor may detect that communication between the transceiver and the glasses is abnormal or interrupted. In response to a case in which communication between the transceiver and the glasses is abnormal or interrupted, the processor determines that the glasses need to perform power-on reset. For example, if a distance between the glasses case and the glasses is less than a preset distance threshold, a wireless connection, for example, a Bluetooth connection or a wireless fidelity (Wi-Fi) connection, may be automatically established between the glasses case and the glasses. That communication is interrupted may be that the wireless connection is broken. That communication is abnormal may be that the wireless connection is not broken, but after sending a message to the glasses through the wireless connection, the transceiver does not receive, for a long time (for example, a preset time), a message returned by the glasses.

For example, the transceiver may be a Bluetooth module, a wireless fidelity (Wi-Fi) module, or the like.

With reference to the first aspect, in another possible design manner, the glasses case further includes a distance detection module. The distance detection module is configured to determine that a distance between the glasses case and the glasses is less than a preset distance threshold. Correspondingly, the wireless charging transmitter circuit is further configured to send the first signal to the glasses in response to a case in which the distance detection module determines that the distance between the glasses case and the glasses is less than the preset distance threshold and the case in which the processor determines that the glasses need to perform power-on reset, to trigger the at least one processor of the glasses to perform power-on reset. In other words, in this embodiment of this application, only when determining that the distance between the glasses case and the glasses is less than the preset distance threshold and determining that the glasses need to perform power-on reset, the glasses case may send the first signal to the glasses, to trigger the at least one processor to perform power-on reset.

With reference to the first aspect, in another possible design manner, the distance detection module is a near field communication (NFC) module. Correspondingly, the glasses also include an NFC module, configured to communicate with the NFC module of the glasses case. For example, the preset distance threshold may be 11 millimeters (mm), 12 mm, or the like. The preset distance threshold may be set based on sensitivity of the NFC module.

With reference to the first aspect, in another possible design manner, the distance detection module is an optical proximity sensor.

With reference to the first aspect, in another possible design manner, the distance detection module is a Hall effect sensor.

With reference to the first aspect, in another possible design manner, the distance detection module is a distance sensor.

With reference to the first aspect, in another possible design manner, the distance detection module is a sensor that detects that the glasses are placed in the glasses case. The distance detection module determines that the distance between the glasses case and the glasses is less than the preset distance threshold based on a fact that the glasses are placed in the glasses case.

With reference to the first aspect, in another possible design manner, the wireless charging transmitter module is further configured to send a second signal to the glasses to wirelessly charge the glasses. The second signal is different from the first signal. In other words, the glasses case sends the second signal to the glasses to wirelessly charge the glasses (namely, normal charging). The glasses case may send the first signal different from the second signal (namely, a signal sent during normal charging) to the glasses, to trigger the processor of the glasses to perform power-on reset.

With reference to the first aspect, in another possible design manner, duration of the first signal is longer than duration of the second signal. Specifically, the duration of the second signal is less than preset duration, and the duration of the first signal is greater than the preset duration.

According to a second aspect, an embodiment of this application provides a pair of glasses. The glasses include a wireless charging receiver circuit, a control circuit, and a processor. The wireless charging receiver circuit and the control circuit are electrically connected to the processor. The wireless charging receiver circuit is configured to receive a first signal sent by a glasses case. The control circuit is configured to, in response to the first signal, control the processor to perform power-on reset. In other words, the glasses may automatically perform hardware reset without disposing a reset button.

With reference to the second aspect, in a possible design manner, the wireless charging receiver circuit is further configured to receive a second signal sent by the glasses case. In other words, the wireless charging receiver circuit may receive the first signal or the second signal. Both the first signal and the second signal may be used to charge a battery of the glasses.

With reference to the second aspect, in a possible design manner, duration of the first signal is first duration, and the first duration is greater than preset duration. Duration of the second signal is second duration, and the second duration is less than the preset duration. To be specific, in response to the first signal that is sent by the glasses case and that is different from the second signal (namely, a signal sent during normal charging), the glasses may trigger the processor to perform power-on reset.

With reference to the second aspect, in a possible design manner, the control circuit may include a reset circuit and a wireless charging circuit. The reset circuit is electrically connected to the wireless charging receiver circuit, the reset circuit is electrically connected to the wireless charging circuit, and the wireless charging circuit is electrically connected to the processor. The reset circuit is configured to send a first voltage level to the wireless charging circuit in response to the first signal. The wireless charging circuit is configured to, in response to the first voltage level, control the processor to perform power-on reset. Specifically, the reset circuit is connected to a control pin (for example, an INT pin) of the wireless charging circuit.

With reference to the second aspect, in a possible design manner, the reset circuit is further configured to continuously send the first voltage level to the wireless charging circuit within the first duration in response to the first signal. The wireless charging circuit is further configured to determine that the received first voltage level lasts for the preset duration, and in response to determining that the first voltage level received by the wireless charging circuit lasts for the preset duration, control the processor to perform power-on reset.

The wireless charging circuit has the following characteristic: If the first voltage level (for example, a low level) received by the control pin (for example, the INT pin) of the wireless charging circuit lasts for the preset duration, the wireless charging circuit may disconnect a path from a voltage of battery (VBAT) to a voltage of system (VSYS). For example, the wireless charging circuit may include a timer. The timer is configured to determine that the first voltage level (for example, the low level) received by the wireless charging circuit lasts for the preset duration.

With reference to the second aspect, in another possible design manner, the preset duration may be a time condition for triggering the wireless charging circuit of the glasses to disconnect the path from the VBAT to the VSYS. Specifically, if the wireless charging circuit detects that the first voltage level received by the control pin (for example, the INT pin) lasts for the preset duration, the wireless charging circuit may disconnect the path from the VBAT to the VSYS. For example, the preset duration may be eight seconds. Certainly, the preset duration may also be another time length. Different wireless charging circuits have different preset duration. This is not limited in this embodiment of this application.

It may be understood that, because the duration (namely, the first duration) of the first signal is greater than the preset duration, the reset circuit may continuously send the first voltage level (for example, the low level) to the wireless charging circuit within the first duration in response to the first signal whose duration is greater than the preset duration. Because the first duration is greater than the preset duration, the wireless charging circuit may determine that the first voltage level (for example, the low level) received by the wireless charging circuit lasts for the preset duration. In response to determining that the first voltage level (for example, the low level) received by the wireless charging circuit lasts for the preset duration, the wireless charging circuit may disconnect the path from the VBAT to the VSYS to control the processor to perform power-on reset.

The duration of the first signal (namely, the first duration) is greater than the preset duration, and the duration (namely, the second duration) of the second signal is less than the preset duration. For example, when the preset duration is 8 s, the second duration may be 6 s, 5 s, or the like. Therefore, even if the reset circuit receives the second signal sent by the wireless charging receiver circuit, because the duration of the first signal is less than the preset duration, the reset circuit can continuously send the first voltage level (for example, the low level) to the wireless charging circuit only within the second duration. In response to a case in which duration of receiving the first voltage level is the second duration less than the preset duration, the wireless charging circuit does not disconnect the path from the VBAT to the VSYS, and the wireless charging circuit supplies power to the processor, so that the processor operates normally.

In summary, the glasses case may send the first signal to the glasses, to trigger the processor of the glasses to perform power-on reset. However, the second signal cannot be used to trigger the processor of the glasses to perform power-on reset. However, both the first signal and the second signal may be used to wirelessly charge the glasses.

With reference to the second aspect, in another possible design manner, the reset circuit includes a transformer, a comparator, and an inverter. The transformer is connected to the wireless charging receiver circuit, and converts a signal received by the wireless charging receiver circuit into a direct current electrical signal. A first input end of the comparator receives the direct current electrical signal, a second input end of the comparator is connected to a reference signal, an output end of the comparator is connected to an input end of the inverter, and an output end of the inverter controls the processor to perform power-on reset. In response to a case in which the signal received by the wireless charging receiver circuit is the first signal, the transformer converts the first signal into a first direct current electrical signal, the first direct current electrical signal is greater than the reference signal, the comparator outputs a high level, and the inverter outputs a low level. The first voltage level is a low level.

Because the duration of the first signal is greater than the preset duration, duration of the first direct current electrical signal is also greater than the preset duration. Therefore, the comparator may continuously output the high level within a period of time greater than the preset duration, so that the inverter continuously outputs the low level within the period of time greater than the preset duration. Therefore, the low level received by the control pin of the wireless charging circuit may last for the preset duration, and the wireless charging circuit may disconnect the path from the VBAT to the VSYS to control the processor to perform power-on reset.

With reference to the second aspect, in another possible design manner, the glasses further include a transceiver, and the transceiver is configured to send a reset request message to the glasses case. The reset request message is used to request to perform power-on reset on the glasses.

With reference to the second aspect, in another possible design manner, the glasses further include an NFC module. The NFC module is configured to detect, by the glasses case, that a distance between the glasses and the glasses case is less than a preset distance threshold. The NFC module may be further configured to wirelessly charge, by the glasses case, the glasses.

According to a third aspect, an embodiment of this application provides a wireless charging system. The wireless charging system includes the glasses case described in the foregoing first aspect and any possible design manner of the first aspect and the glasses described in the foregoing second aspect and any possible design manner of the second aspect.

It may be understood that, for beneficial effects that can be achieved by the wireless charging system provided in the third aspect, refer to beneficial effects in the foregoing first aspect and any possible design manner of the first aspect and in the foregoing second aspect and any possible design manner of the second aspect. Details are not described herein again.

DESCRIPTION OF EMBODIMENTS

Figure 1:
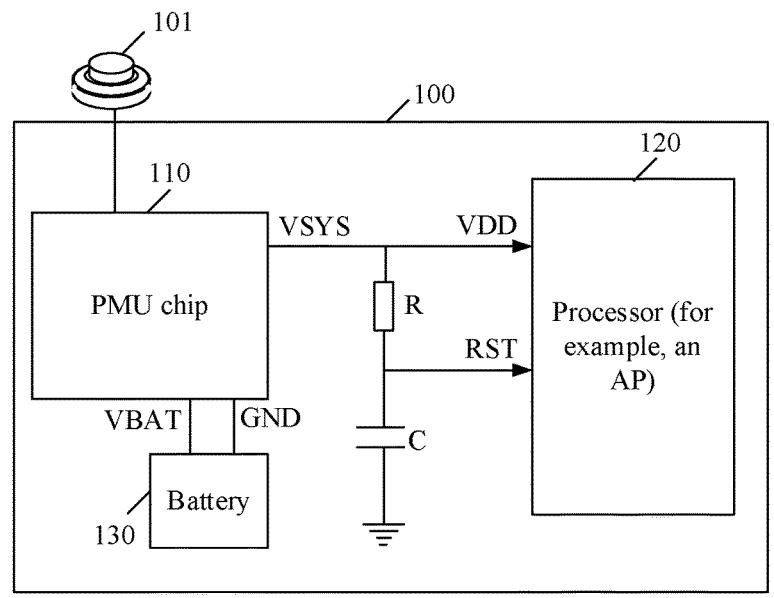
FIG. 1 is a schematic diagram of an example of a reset circuit in a conventional technology.

FIG. 1 is a schematic diagram of an example of a conventional reset circuit. As shown in FIG. 1, a reset circuit 100 of an electronic device (for example, glasses) may include a power management unit (PMU) chip 110, a processor (for example, an application processor (AP)) 120, and a battery 130.

As shown in FIG. 1, the battery 130 supplies power to the PMU chip 110. The PMU chip 110 supplies power to the processor 120. A reset (RST) pin is disposed on the processor 120.

A reset button 101 may be disposed on the electronic device. As shown in FIG. 1, the reset button 101 may be connected to the PMU chip 110. The reset button 101 is configured to control closing and opening of an internal switch of the PMU chip 110, to connect or disconnect a path from a VBAT to a VSYS of the PMU chip 110. Specifically, a user provides an input signal by using the reset button 101, to open the internal switch of the PMU chip 110 to disconnect the path from the VBAT to the VSYS.

Specifically, a hardware reset process of the processor 120 may include: (1) The reset button 101 is not tapped by the user, the internal switch of the PMU chip 110 is closed, the path from the VBAT to the VSYS is connected, the PMU chip 110 supplies power to a power supply pin (for example, a VDD pin) of the processor 120 by using the VSYS, and an input of the RST pin of the processor 120 is a high level. In this case, the processor 120 operates normally. (2) The user taps the reset button 101, the internal switch of the PMU chip 110 is opened, and the path from the VBAT to the VSYS is disconnected. In this case, the VDD pin of the processor 120 is powered down, the input of the RST pin of the processor 120 is a low level, and the processor 120 performs hardware reset. (3) After the user stops tapping the reset button 101, the internal switch of the PMU chip 110 is re-closed, and the path from the VBAT to the VSYS is connected. In this case, the power supply pin (for example, the VDD pin) of the PMU chip 110 is powered on, the input of the RST pin of the processor 120 is a high level, and the processor 120 operates normally.

Only when the user manually operates the reset button, the foregoing hardware reset circuit can control the electronic device to perform hardware reset, and the electronic device cannot automatically perform hardware reset. Consequently, the user has a relatively poor use experience. In addition, disposing the reset button on the electronic device may further destroy an aesthetic appearance of the electronic device.

In addition, the PMU chip 110 has the following characteristic: The PMU chip 110 disconnects the path from the VBAT to the VSYS only after an external input signal (for example, the input signal provided by the user by using the reset button 101) lasts for a specific period of time, for example, eight seconds. Therefore, the user needs to tap the reset button 101 for a specific period of time (for example, 8 s) to implement hardware reset. Consequently, a user operation is complex, and user experience is affected.

Figure 2:
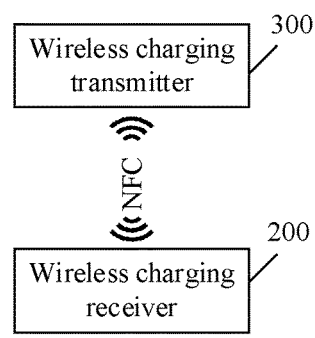
FIG. 2 is a schematic diagram of an example of a charging system according to an embodiment of this application.

An embodiment of this application provides a hardware reset method. The method may be applied to a wireless charging system shown in FIG. 2. As shown in FIG. 2, the wireless charging system may include a wireless charging transmitter 300 and a wireless charging receiver 200. For example, the wireless charging transmitter 300 may be a glasses case 310 described in the embodiments of this application, and the wireless charging receiver 200 may be glasses 210 described in the embodiments of this application.

When a distance between the wireless charging receiver 200 and the wireless charging transmitter 300 is less than a preset distance threshold, the wireless charging transmitter 300 may charge the wireless charging receiver 200. The wireless charging transmitter 300 may charge the wireless charging receiver 200 by using a wireless charging technology.

For example, the wireless charging technology may be an NFC technology, an alliance for wireless power (A4WP) technology, a power matters alliance (PMA) technology, a Qi technology, or the like. For example, the wireless charging receiver 200 and the wireless charging transmitter 300 each may include a near field communication (NFC) chip. As shown in FIG. 2, the wireless charging transmitter 300 may charge the wireless charging receiver 200 by using the NFC technology.

In the foregoing wireless charging process, the wireless charging transmitter 300 may send a preset signal (namely, a first signal in the embodiments of this application) to the wireless charging receiver 200 when a distance between a wireless charging transmitter 200 and a wireless charging receiver 120 is less than the preset distance threshold and the wireless charging receiver 200 needs to perform hardware reset. In response to the preset signal, a processor of the wireless charging receiver 200 may perform power-on reset (namely, hardware reset). In other words, without disposing a reset button, the wireless charging receiver 200 may automatically perform hardware reset based on the preset signal transmitted by the wireless charging transmitter 300.

Figure 3A:
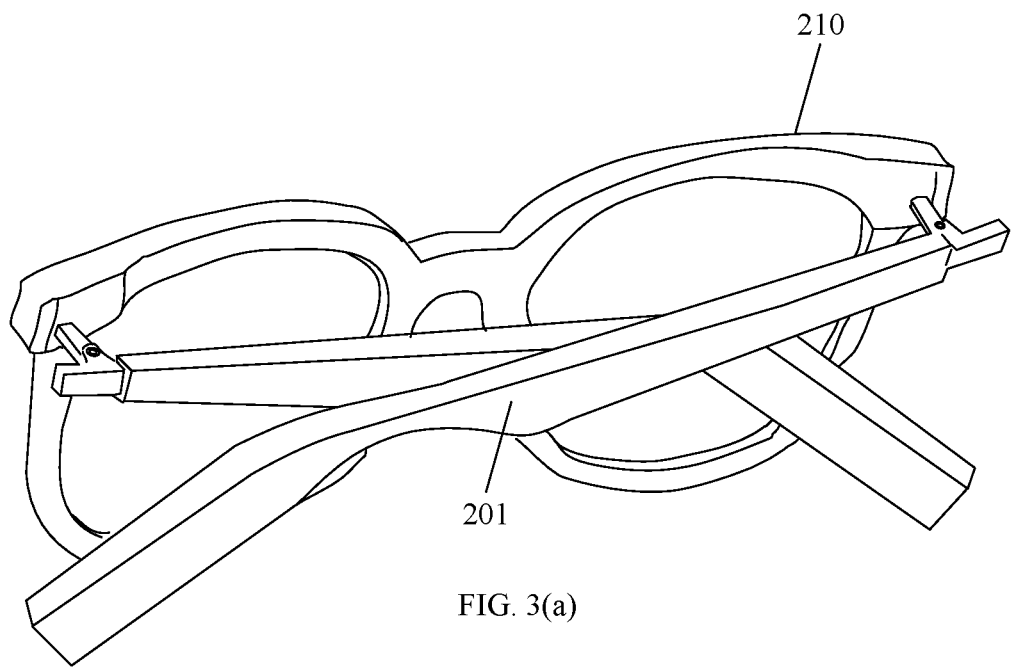
FIG. 3(a) and FIG. 3(b) are schematic diagrams of examples of product forms of a pair of glasses and a glasses case according to an embodiment of this application.

For example, the wireless charging receiver 200 may be smart glasses (for example, the glasses 210 shown FIG. 3(a)) having a wireless charging receiver circuit, a mobile phone, a tablet computer, a desktop computer, a laptop computer, a handheld computer, a notebook computer, an ultra-mobile personal computer (UMPC), a netbook, or a device such as a cellular phone, a personal digital assistant (PDA), an augmented reality (AR) device, a virtual reality (VR) device, a media player, or a television. A specific form of the device is not specifically limited in this embodiment of this application.

The wireless charging transmitter 300 may be an electronic device that can provide a wireless charging service for the wireless charging receiver 200. For example, the wireless charging transmitter 300 may be a dedicated wireless charger, and the wireless charger may provide the wireless charging service for one or more wireless charging receivers 200. Alternatively, the wireless charging transmitter 300 may be a storage box or a storage bag configured to accommodate the wireless charging receiver 200. The storage box or the storage bag includes a wireless charging transmitter circuit. The storage box or the storage bag may transmit a charging signal to the wireless charging receiver circuit of the wireless charging receiver 200 through the wireless charging transmitter circuit, to wirelessly charge the wireless charging receiver 200.

Figure 3B:
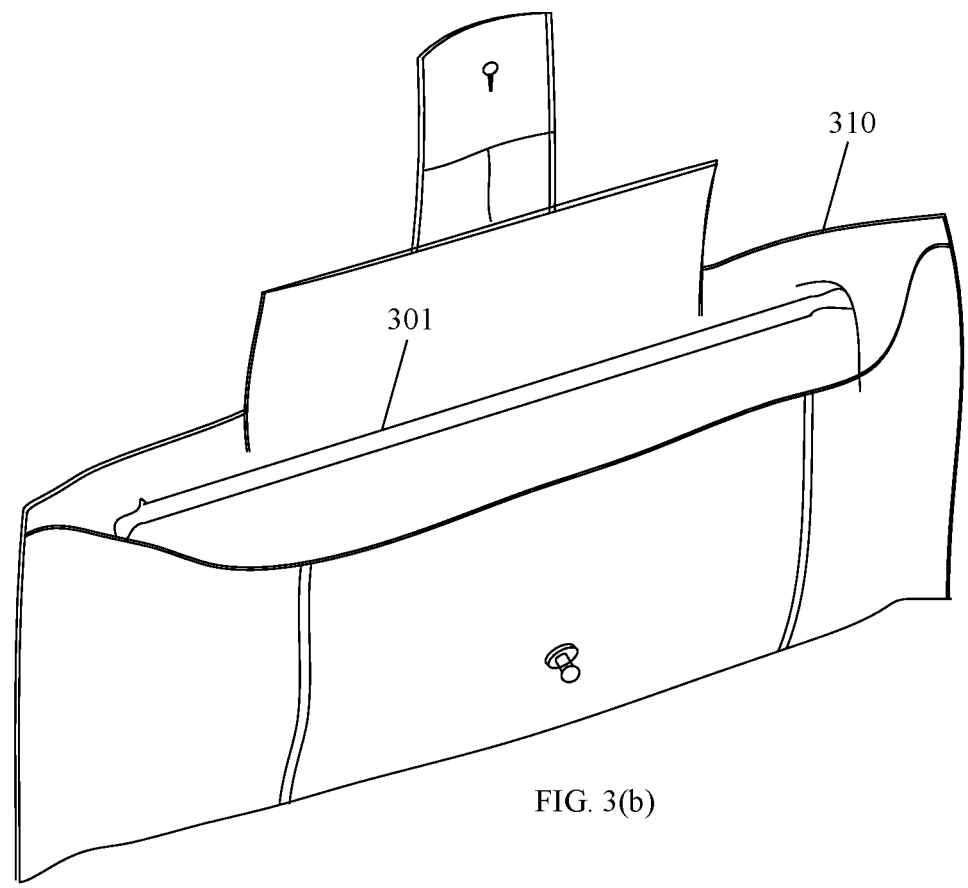
Figure 4A:
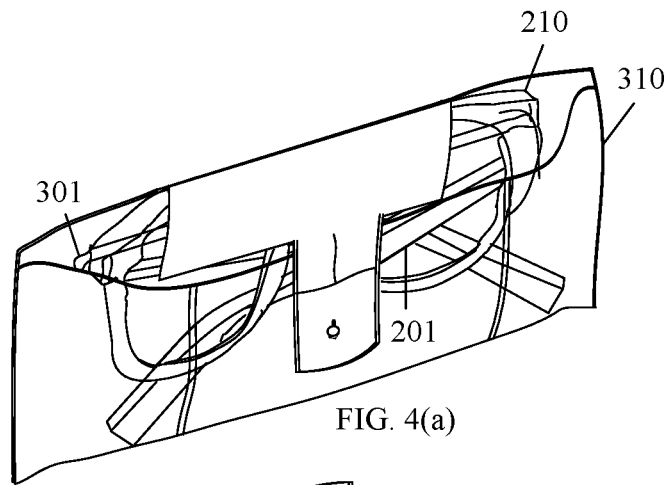
FIG. 4(a), FIG. 4(b), and FIG. 4(c) are schematic diagrams of examples of product forms of a pair of glasses and a glasses case according to an embodiment of this application.
Figure 4B:
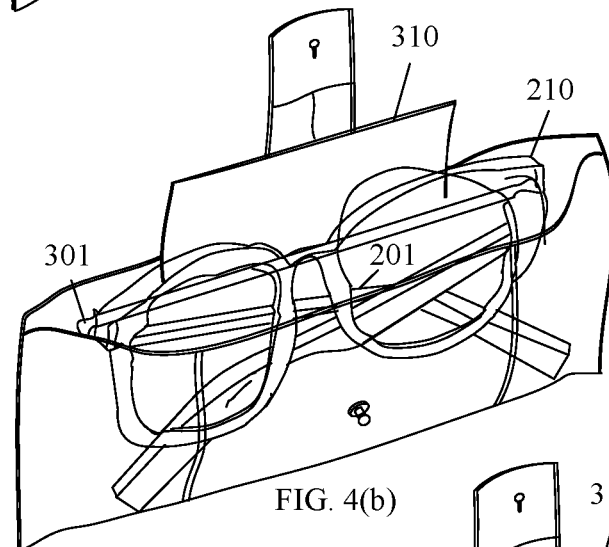

In an example, the wireless charging receiver 200 shown in FIG. 2 may be the glasses 210 shown in FIG. 3(a), and the wireless charging transmitter 300 may be the glasses case 310 shown in FIG. 3(b). The glasses case 310 is configured to accommodate the glasses 210. For example, as shown in FIG. 4(a) or FIG. 4(b), the glasses 210 may be accommodated in the glasses case 310.

In addition, the glasses case 310 may further charge the glasses 210. For example, a wireless charging receiver circuit 201, for example, a receive (Rx) coil, may be disposed in a leg of the glasses 210. A wireless charging transmitter circuit 301, for example, a transmit (Tx) coil, may also be disposed in the glasses case 310. When a distance between the glasses 210 (for example, the wireless charging receiver circuit 201) and the glasses case 310 (for example, the wireless charging transmitter circuit 301) is less than the preset distance threshold, the glasses case 310 may wirelessly charge the glasses 210.

In this embodiment of this application, that the distance between the glasses 210 (for example, a leg 201) and the glasses case 310 (for example, a charging module 301) is less than the preset distance threshold may include the following three cases:

Case (1): As shown in FIG. 4(a), the glasses 210 are placed inside the glasses case 310, and the glasses case 310 is closed.

Case (2): As shown in FIG. 4(b), the glasses 210 are placed inside the glasses case 310, and the glasses case 310 is not closed.

Figure 4C:
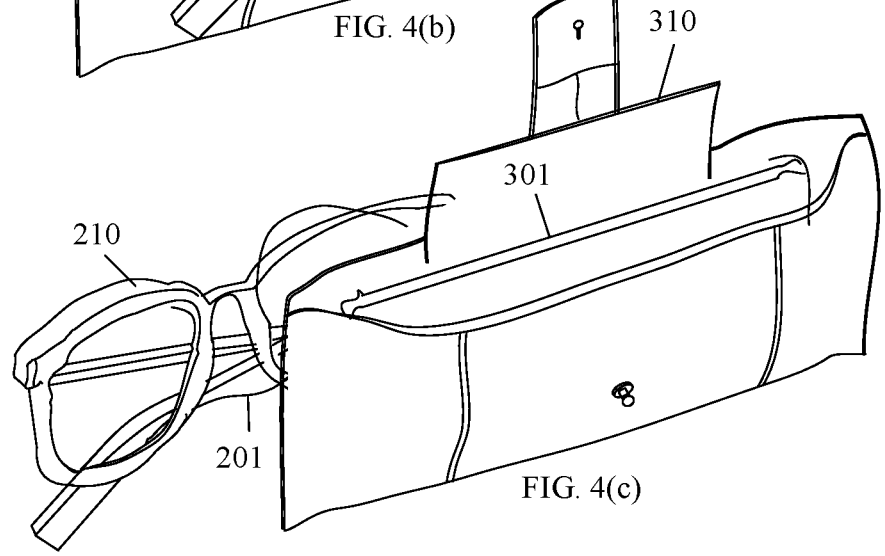

Case (3): As shown in FIG. 4(c), the glasses 210 are not placed inside the glasses case 310, but the distance between the glasses 210 (for example, the wireless charging receiver circuit 201) and the glasses case 310 (for example, the wireless charging transmitter circuit 301) is less than the preset distance threshold.

It should be noted that, the case (2) in which the glasses case 310 is not closed and the glasses 210 are placed inside the glasses case 310 may be specifically as follows: The glasses case 310 is not closed, and the glasses 210 are completely placed inside the glasses case 310. Alternatively, the glasses case 310 is not closed, and a part of the glasses 210 is placed inside the glasses case 310 and the other part of the glasses 210 is placed outside the glasses case 310.

It can be learned from the foregoing description that in this embodiment of this application, regardless of whether the glasses 210 are placed inside the glasses case 310, the glasses case 310 may wirelessly charge the glasses 210, provided that the distance between the glasses 210 and the glasses case 310 is less than the preset distance threshold. The preset distance threshold may be a maximum distance that the glasses case 310 may charge the glasses 210 by using any one of the foregoing wireless charging technologies (for example, the NFC technology). If the distance between the glasses case 310 and the glasses 210 is greater than or equal to the preset distance threshold, the glasses case 310 cannot wirelessly charge the glasses 210, or the glasses case 310 may wirelessly charge the glasses 210 with a relatively poor charging effect.

FIG. 3(a) and FIG. 3(b) are merely schematic diagrams of examples of a product form of the wireless charging transmitter 300 and a product form of the wireless charging receiver 200 in a manner of examples. The product form of the wireless charging transmitter 300 provided in this embodiment of this application includes but is not limited to the glasses case 310 shown in FIG. 3(b), and the product form of the wireless charging receiver 200 includes but is not limited to the glasses 210 shown in FIG. 3(a).

For ease of understanding, in the following embodiment, an implementation of this embodiment of this application is described with reference to accompanying drawings by using an example in which the wireless charging transmitter 300 is the glasses case 310 and the wireless charging receiver 200 is the glasses 210.

Figure 5A:
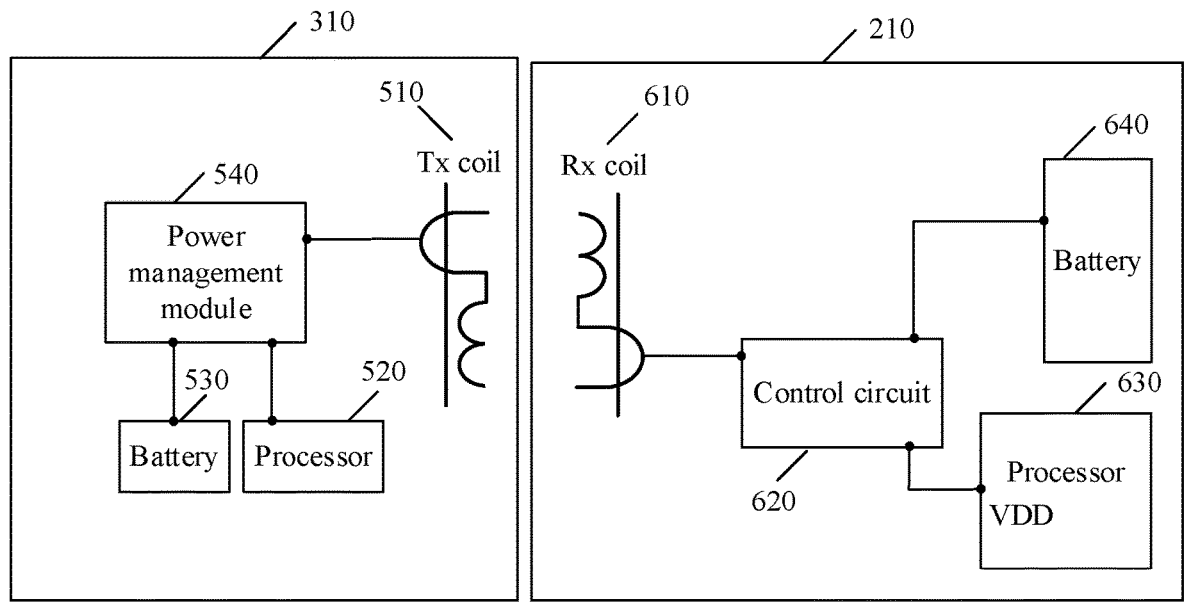
FIG. 5A is a schematic structural diagram of a glasses case and a pair of glasses according to an embodiment of this application.

As shown in FIG. 5A, the glasses case 310 may include a wireless charging transmitter circuit (for example, a Tx coil) 510, a processor 520, and a housing (not shown in FIG. 5A). The housing has a cavity configured to accommodate the glasses 210. For example, the housing may be a housing of the glasses case 310 shown in FIG. 3(b).

As shown in FIG. 5A, the glasses case 310 may further include a battery 530 and a power management module 540. The battery 530 may supply power to various components (for example, the Tx coil 510 and the processor 520) of the glasses case 310. The battery 530 may be a rechargeable battery. The power management module 540 is connected to the battery 530, the processor 520, and the Tx coil 510. The power management module 540 receives an input from the battery 520, to supply power to the processor 520, the Tx coil 510, and the like.

As shown in FIG. 5A, the glasses 210 may include a wireless charging receiver circuit (for example, an Rx coil) 610, a control circuit 620, a processor 630, and a main body of the glasses 210 (not shown in FIG. 5A). For example, the main body of the glasses 210 may include a frame, a lens, and the like of the glasses 210. The processor 630 may be any processor (for example, an AP), a processor chip (for example, a Bluetooth chip), or the like in the glasses 210.

As shown in FIG. 5A, the glasses 210 may further include a battery 640. The battery 640 may supply power to various components (for example, the wireless charging transmitter circuit 610 and the processor 630) of the glasses 210. The battery 640 may be a rechargeable battery. The battery 640 may be configured to store a quantity of electric charge that is received by the glasses 210 and that is wirelessly charged by the glasses case 310.

The Rx coil 610 is connected to the control circuit 620. For example, as shown in FIG. 5A, the Rx coil 610 is connected to an input end of the control circuit 620. An output end of the control circuit 620 is connected to a power supply pin (for example, a VDD pin) of the processor 630. Another output end of the control circuit 620 is connected to the battery 640. The control circuit 620 may transmit, to the battery 640 by using the output end, a signal (for example, a first signal or a second signal) received from the Rx coil 610, to charge the battery 640.

It should be noted that the Tx coil 510 is coupled to the Rx coil 610. Therefore, in this embodiment of this application, the Tx coil 510 may send the first signal and the second signal to the Rx coil 610. The first signal and the second signal are described in detail in the following embodiment.

In this embodiment of this application, in response to a case in which the processor 520 determines that the glasses 210 need to perform power-on reset, the Tx coil 510 may send the first signal to the glasses 210 (to be specific, the Rx coil 610 of the glasses 210), to trigger at least one processor (for example, the processor 630) of the glasses 210 to perform power-on reset. The Rx coil 610 may receive the first signal sent by the glasses case 310 (to be specific, the Tx coil 510 of the glasses case 310), and then send the first signal to the control circuit 620. In response to the first signal, the control circuit 620 may control the processor 630 to perform power-on reset.

In other words, in this embodiment of this application, in response to determining that the glasses 210 need to perform power-on reset, the glasses case 310 may send the first signal to the glasses 210, to trigger the processor 630 of the glasses 210 to perform power-on reset. In other words, the glasses 210 may automatically perform hardware reset without disposing a reset button.

Figure 5B:
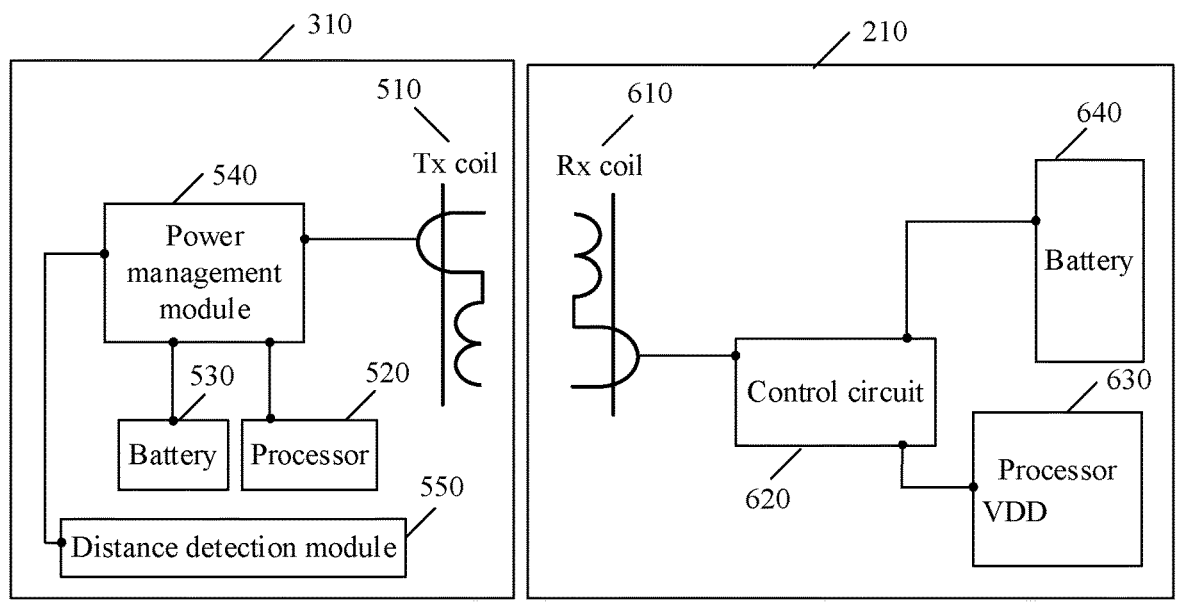
FIG. 5B is a schematic structural diagram of another glasses case and another pair of glasses according to an embodiment of this application.

Further, as shown in FIG. 5B, the glasses case 310 may further include a distance detection module 550. The distance detection module 550 is configured to determine that the distance between the glasses case 310 and the glasses 210 is less than the preset distance threshold.

The Tx coil 510 is specifically configured to send the first signal to the glasses 210 in response to a case in which the distance detection module 550 determines that the distance between the glasses case 310 and the glasses 210 is less than the preset distance threshold and the case in which the processor 520 determines that the glasses 210 need to perform power-on reset, to trigger the at least one processor (for example, the processor 630) of the glasses 210 to perform power-on reset.

In other words, in this embodiment of this application, only when determining that the distance between the glasses case 310 and the glasses 210 is less than the preset distance threshold and determining that the glasses 210 need to perform power-on reset, the glasses case 310 may send the first signal to the glasses 210, to trigger the processor 630 to perform power-on reset.

It should be noted that, in this embodiment of this application, that the distance between the glasses case 310 and the glasses 210 is less than the preset distance threshold may include the foregoing three cases: Case (1), Case (2), and Case (3). Details are not described herein in this embodiment of this application.

With reference to Case (1), Case (2), and Case (3), in an implementation, the distance detection module 550 may be an NFC module. Correspondingly, the glasses 210 also include an NFC module (not shown in the accompanying drawings), configured to communicate with the NFC module of the glasses case 310. For example, the preset distance threshold may be 11 millimeters mm, 12 mm, or the like. The preset distance threshold may be set based on sensitivity of the NFC module.

With reference to Case (1), Case (2), and Case (3), in another implementation, the distance detection module 550 may be an optical proximity sensor. For example, the optical proximity sensor may include, for example, a light-emitting diode (organic light-emitting diode, LED) and an optical detector (for example, a photodiode). The light-emitting diode may be an infrared light-emitting diode. The glasses case 310 emits infrared light outwardly by using the light-emitting diode. The glasses case 310 detects reflected infrared light from a nearby object by using the optical detector. When detecting sufficient reflected light, the glasses case 310 may determine that there is an object near the glasses case 310. When detecting insufficient reflected light, the glasses case 310 may determine that there is no object near the glasses case 310. The glasses case 310 may detect, by using the optical proximity sensor, whether the distance between the glasses 210 and the glasses case 310 is less than the preset distance threshold.

With reference to Case (1), Case (2), and Case (3), in another implementation, a Hall effect sensor (namely, a magnetic sensor) may determine that the distance between the glasses case 310 and the glasses 210 is less than the preset distance threshold. In other words, the distance detection module 550 is a Hall effect sensor. The glasses case 310 may determine, based on magnetic field strength detected by the Hall effect sensor, that the distance between the glasses 210 and the glasses case 310 is less than the preset distance threshold.

With reference to Case (1), Case (2), and Case (3), in another implementation, the distance detection module 550 may be a distance sensor. The distance sensor may be configured to measure a distance. The glasses case 310 may measure the distance by using infrared or laser light.

With reference to Case (1) and Case (2), in an implementation, the distance detection module 550 may be a sensor that detects that the glasses 210 are placed in the glasses case 310. The distance detection module 550 determines, based on a fact that the glasses 210 are placed in the glasses case 310, that the distance between the glasses case 310 and the glasses 210 is less than the preset distance threshold.

It should be noted that a manner in which the glasses case 310 determines that the distance between the glasses case 310 and the glasses 210 is less than the preset distance threshold includes but is not limited to the foregoing listed manners. Another implementation is not described herein in this embodiment of this application.

For example, in this embodiment of this application, there may be at least three following manners in which the processor 520 determines that the glasses 210 need to perform power-on reset.

Manner (1): The glasses case 310 may further include a reset button (which is not shown in the accompanying drawings). The processor 520 may determine, based on an input signal received from the reset button, that the glasses 210 need to perform power-on reset.

For example, when a user wants to control the glasses 210 (for example, the processor 630 of the glasses 210) to perform hardware reset, the glasses 210 may be placed in the glasses case 310 or near the glasses case 310, so that the distance between the glasses case 310 and the glasses 210 is less than the preset distance threshold. Then, the user may tap the reset button. The processor 520 may detect a user input acting on the reset button. In response to the input signal received from the reset button, the processor 520 may determine that the glasses 210 need to perform power-on reset.

The reset button may be a hardware switch or a button disposed on the housing of the glasses case 310. Alternatively, the glasses case 310 may further include a touchscreen. The reset button may be a preset option or a button displayed on the touchscreen. The touchscreen may further display information such as a remaining quantity of electric charge of the glasses case 310.

It should be noted that although a reset button is disposed in each of the glasses case 310 and the reset circuit 100 shown in FIG. 1, a difference is that in the reset circuit shown in FIG. 1, only when the input signal continuously provided by the user by using the reset button 101 lasts for preset duration (for example, 8 s), the processor 120 may implement hardware reset; but a user input acting on the reset button of the glasses case 310 does not need to last for the preset duration, and the processor 520 may determine that the glasses 210 need to perform power-on reset, and trigger the processor 630 of the glasses 210 to perform power-on reset. For example, in response to a single-tap operation performed by the user on the reset button, the processor 520 determines that the glasses 210 need to perform power-on reset, and triggers the processor 630 of the glasses 210 to perform power-on reset.

Figure 5C:
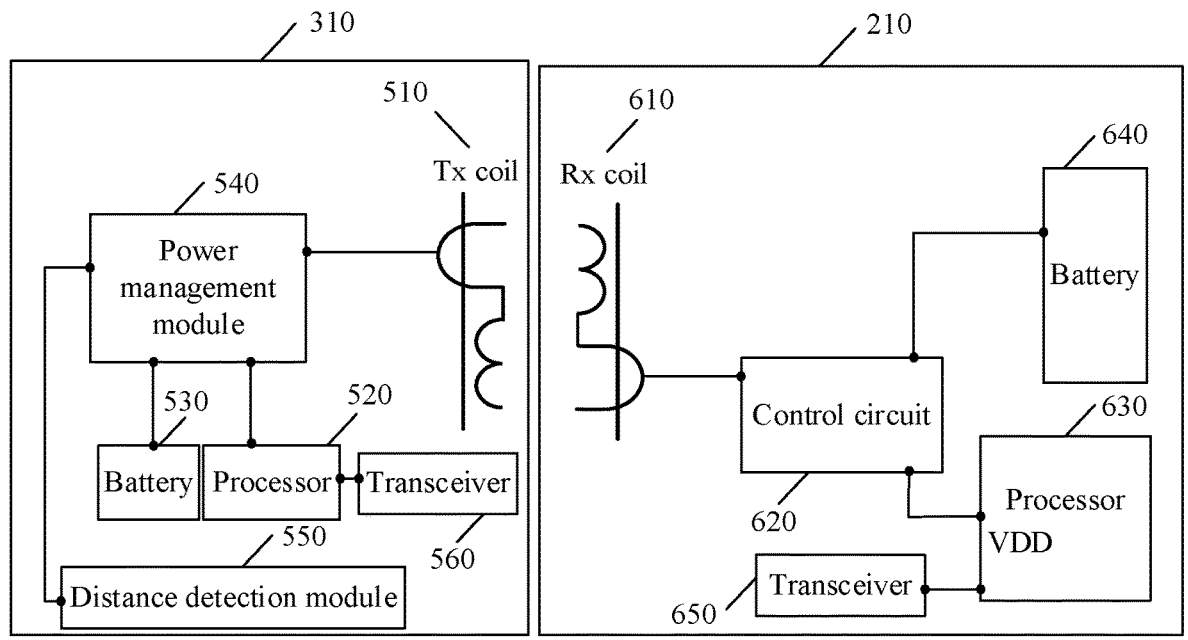
FIG. 5C is a schematic structural diagram of another glasses case and another pair of glasses according to an embodiment of this application.

Manner (2) and Manner (3): As shown in FIG. 5C, the glasses case 310 may further include a transceiver 560. Correspondingly, as shown in FIG. 5C, the glasses 210 may include a transceiver 650. For example, the transceiver 560 and the transceiver 650 may be Bluetooth modules, Wi-Fi modules, or the like.

In Manner (2), the transceiver 560 of the glasses case 310 is configured to receive a reset request message sent by the glasses 210 (for example, the transceiver 650 of the glasses 210). The reset request message is used to request to perform power-on reset on the glasses 210. The processor 520 determines, based on the reset request message received by the transceiver 560, that the glasses 210 need to perform power-on reset. The transceiver 650 of the glasses 210 may send the reset request message to the glasses case 310 (for example, the transceiver 560 of the glasses case 310) when the processor 630 is faulty.

In Manner (3), the processor 520 may detect that communication between the transceiver 560 and the transceiver 650 of the glasses 210 is abnormal or interrupted. In response to a case in which communication between the transceiver 560 and the transceiver 650 is abnormal or interrupted, the processor 520 determines that the glasses 210 need to perform power-on reset. For example, if the distance between the glasses case 310 and the glasses 210 is less than the preset distance threshold, a wireless connection (for example, a Bluetooth connection or a Wi-Fi connection) may be automatically established between the glasses case 310 (for example, the transceiver 560) and the glasses 210 (for example, the transceiver 650). That communication is interrupted may be that the wireless connection is broken. That communication is abnormal may be that the wireless connection is not broken, but after sending a message to the glasses 210 through the wireless connection, the transceiver 560 does not receive, for a long time (for example, a preset time), a message returned by the glasses 210.

In this embodiment of this application, the wireless charging transmitter circuit (for example, the Tx coil) 510 is further configured to send the second signal to the glasses 210 to wirelessly charge the glasses 210. The second signal is different from the first signal. In other words, the glasses case 310 sends the second signal to the glasses 210 to wirelessly charge the glasses 210 (namely, normal charging). The glasses case 310 may send the first signal different from the second signal (namely, a signal sent during normal charging) to the glasses 210, to trigger the processor 630 of the glasses 210 to perform power-on reset.

That the second signal is different from the first signal may be specifically as follows: Duration of the first signal is longer than duration of the second signal.

For example, in this embodiment of this application, the glasses case 310 may wirelessly charge the glasses 210 in a pulse width modulation manner. In other words, the first signal and the second signal may be pulse-width modulated pulse signals. For example, it is assumed that the duration of the first signal is 10 seconds, and the duration of the second signal is 5 s. The first signal may be a pulse signal whose duration is 10 s in FIG. 6, and the second signal may be a pulse signal whose duration is 5 s in FIG. 6.

Correspondingly, the wireless charging receiver circuit (for example, the Rx coil) 610 of the glasses 210 is further configured to receive the second signal sent by the glasses case 310 (for example, the Tx coil 510). In other words, the Rx coil 610 may receive the first signal or the second signal. Both the first signal and the second signal may be used to charge the battery 640.

Figure 7:
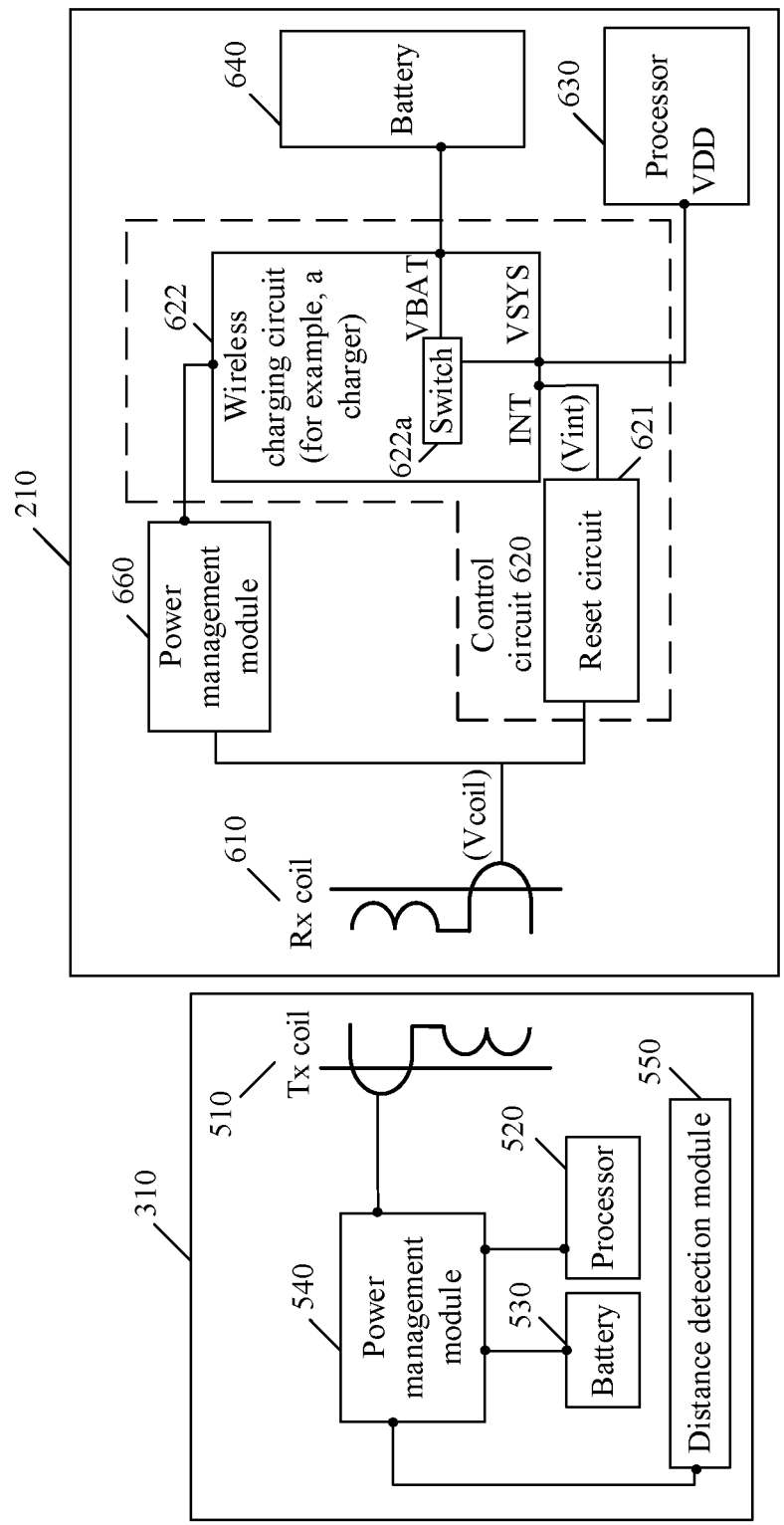
FIG. 7 is a schematic structural diagram of another glasses case and another pair of glasses according to an embodiment of this application.

Specifically, with reference to FIG. 5B, as shown in FIG. 7, the glasses 210 may further include a power management module 660, and the control circuit 620 may include a reset circuit 621 and a wireless charging circuit 622.

Figure 6:
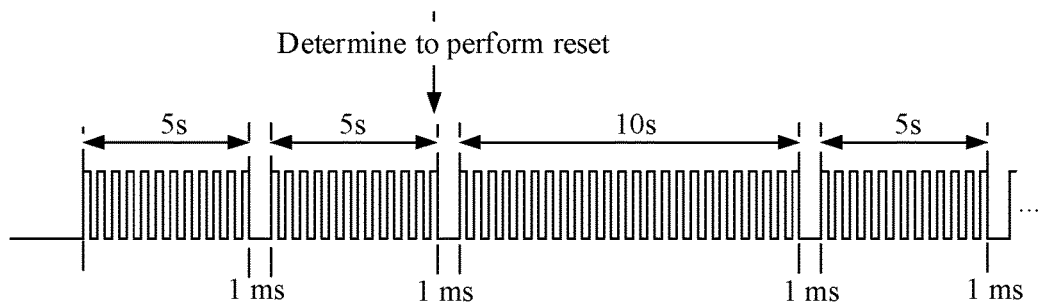
FIG. 6 is a diagram of a signal waveform according to an embodiment of this application.

The power management module 660 is electrically connected to the wireless charging receiver circuit (for example, the Rx coil) 610. The power management module 660 is further electrically connected to the wireless charging circuit 622. The wireless charging circuit 622 is electrically connected to the battery 640. For example, as shown in FIG. 6, the wireless charging circuit 622 may be a charger. A VBAT pin of the wireless charging circuit 622 is connected to the battery 640.

In this embodiment of this application, that the glasses 210 receive the first signal and the second signal that are sent by the glasses case 310, to charge the battery 640 may include: The power management module 660 receives the first signal or the second signal sent by the Rx coil 610; the power management module 660 sends a direct current electrical signal to the wireless charging circuit 622 in response to the received first signal or the received second signal; and the wireless charging circuit 622 charges the battery 640 in response to the direct current electrical signal from the power management module 660.

An input end of the reset circuit 621 is connected to the Rx coil 610. An output end of the reset circuit 621 is connected to a control pin (for example, an INT pin) of the wireless charging circuit 622. The wireless charging circuit 622 is further electrically connected to the processor 630. For example, as shown in FIG. 6, a VSYS pin of the wireless charging circuit 622 is connected to the power supply pin (for example, the VDD pin) of the processor 630. The wireless charging circuit 622 supplies power to the processor 630 by using the VSYS pin. The wireless charging circuit 622 may be a PMU chip, or the wireless charging circuit 622 may be a circuit device, module, or unit that is in the PMU chip and that is configured to control a path from a VBAT to a VSYS. Specifically, the wireless charging circuit 622 may control closing and opening of an internal switch of the wireless charging circuit 622, to connect or disconnect the path from the VBAT to the VSYS. For example, as shown in FIG. 7, the wireless charging circuit 622 includes a switch 622a, one end of the switch 622a is connected to the VBAT pin, and the other end of the switch 622a is connected to the VSYS pin. The wireless charging circuit 622 may control the switch 622a to be closed, to connect the path from the VBAT to the VSYS. The wireless charging circuit 622 may also control the switch 622a to be opened, to disconnect the path from the VBAT to the VSYS. It should be noted that the switch 622a shown in FIG. 7 is merely used to illustrate an operating principle of the internal switch of the wireless charging circuit 622, and a specific type and structure of the switch 622a are not limited in this embodiment of this application.

In this embodiment of this application, that the glasses 210 receive the first signal sent by the glasses case 310, to control the processor 630 to perform power-on reset may include: The reset circuit 621 receives the first signal sent by the Rx coil 610; the reset circuit 621 sends a first voltage level to the wireless charging circuit 622 in response to the first signal; and in response to the first voltage level, the wireless charging circuit 622 controls the processor 630 to perform power-on reset. For example, the first voltage level may be a low level.

The wireless charging circuit 622 has the following characteristic: If the first voltage level (for example, the low level) received by the control pin (for example, the INT pin) of the wireless charging circuit 622 lasts for the preset duration, the wireless charging circuit 622 may disconnect the path from the VBAT to the VSYS. For example, the wireless charging circuit 622 may include a timer. The timer is configured to determine that the first voltage level (for example, the low level) received by the wireless charging circuit 622 lasts for the preset duration.

The preset duration may be a time condition for triggering the wireless charging circuit 622 of the glasses 210 to disconnect the path from the VBAT to the VSYS. Specifically, if the wireless charging circuit 622 detects that the low level received by the control pin (for example, the INT pin) lasts for the preset duration, the wireless charging circuit 622 may disconnect the path from the VBAT to the VSYS. For example, the preset duration may be eight seconds. Certainly, the preset duration may also be another time length. Different wireless charging circuits 622 have different duration. This is not limited in this embodiment of this application.

The duration (namely, first duration) of the first signal is greater than the preset duration. For example, when the preset duration is 8 s, the first duration may be 9 s, 10 s, or the like.

It may be understood that, because the duration (namely, the first duration) of the first signal is greater than the preset duration, the reset circuit 621 may continuously send the first voltage level (for example, the low level) to the wireless charging circuit 622 within the first duration in response to the first signal whose duration is greater than the preset duration. Because the first duration is greater than the preset duration, the wireless charging circuit 622 may determine that the first voltage level (for example, the low level) received by the wireless charging circuit 622 lasts for the preset duration. In response to determining that the first voltage level received by the wireless charging circuit 622 lasts for the preset duration, the wireless charging circuit 622 may disconnect the path from the VBAT to the VSYS to control the processor 630 to perform power-on reset.

The duration of the first signal (namely, the first duration) is greater than the preset duration, and the duration (namely, second duration) of the second signal is less than the preset duration. For example, when the preset duration is 8 s, the second duration may be 6 s, 5 s, or the like. Therefore, even if the reset circuit 621 receives the second signal sent by the Rx coil 610, because the duration of the second signal is less than the preset duration, the reset circuit 621 can continuously send the first voltage level (for example, the low level) to the wireless charging circuit 622 only within the second duration. In response to a case in which duration of receiving the first voltage level is the second duration less than the preset duration, the wireless charging circuit 622 does not disconnect the path from the VBAT to the VSYS, and the processor 630 operates normally.

In conclusion, in this embodiment of this application, the glasses case 310 may send the first signal to the glasses 210, to trigger the processor 630 of the glasses 210 to perform power-on reset; but the second signal cannot be used to trigger the processor 630 of the glasses 210 to perform power-on reset. However, both the first signal and the second signal may be used to wirelessly charge the glasses 210.

Referring to FIG. 6, the glasses case 310 sends a pulse signal (namely, the second signal) whose duration is 5 s to the glasses 210 at an interval of preset stop duration (for example, 1 ms), to wirelessly charge the glasses 210. When determining that the processor 630 of the glasses 210 needs to perform power-on reset, the glasses case 310 may send a pulse signal (namely, the first signal) whose duration is 10 s to the glasses 210, to trigger the processor 630 to perform power-on reset.

The preset stop duration may be a time interval at which the glasses case 310 sends two adjacent second signals when charging the glasses 210 in the pulse width modulation manner. In other words, the glasses case 310 may send one second signal to the glasses 210 at the interval of the preset stop duration. For example, the preset stop duration may be 1 ms, namely, 1000 microseconds, as shown in FIG. 6.

It should be noted that in this embodiment of this application, the preset stop duration (for example, 1 ms) is greater than or equal to minimum detection duration of the INT pin of the wireless charging circuit 622 (for example, the Charger). The minimum detection duration of the INT pin is minimum duration after which the wireless charging circuit 622 can detect whether a signal is input into the INT pin.

Figure 8:
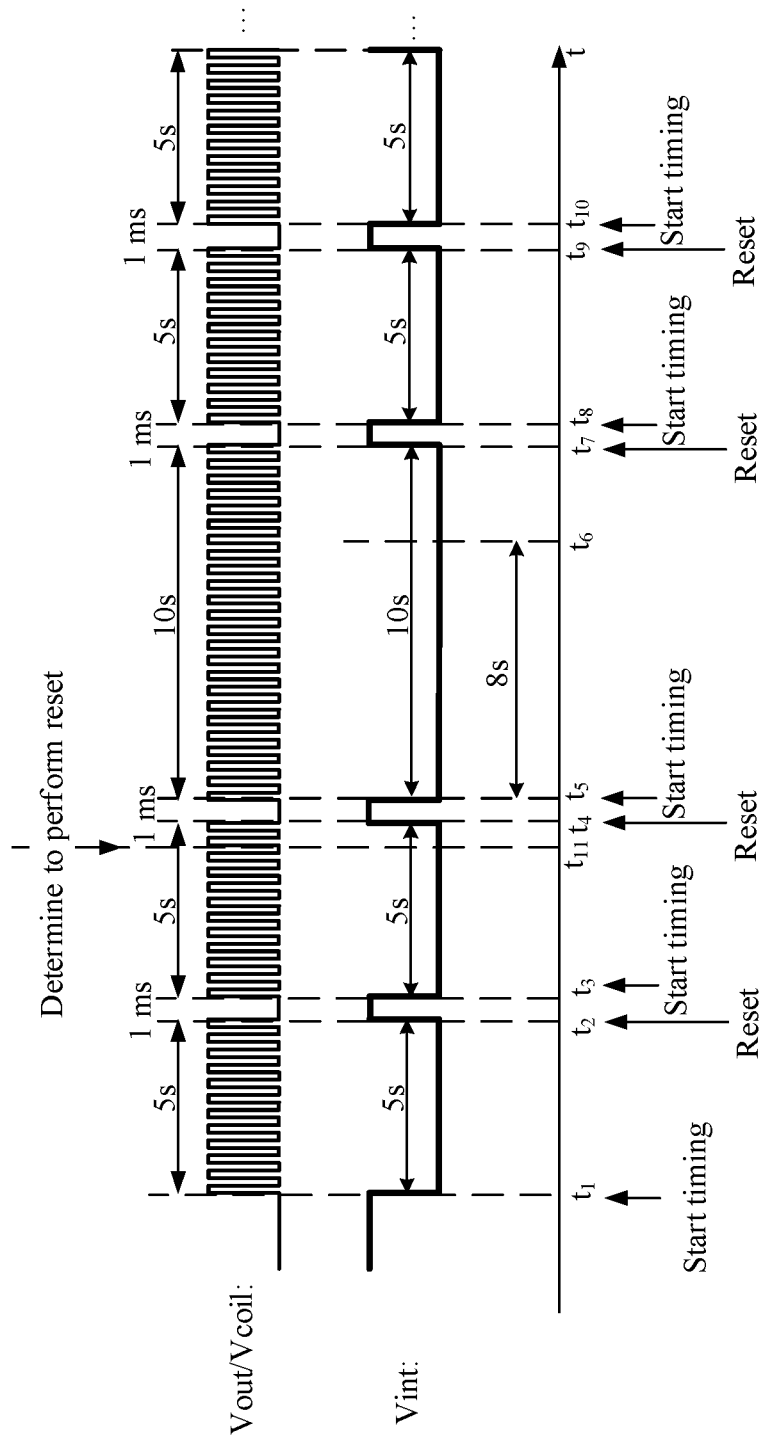
FIG. 8 is a diagram of another signal waveform according to an embodiment of this application.

For example, the preset duration is 8 s, the duration of the first signal (namely, the first duration) is 10 s, and the duration of the second signal (namely, the second duration) is 5 s. FIG. 8 is a diagram of waveforms of Vout, Vcoil, and Vint. Vout is a signal (for example, the first signal or the second signal) sent by the Tx coil 510 to the Rx coil 610. Vcoil is a signal (for example, a first signal or a second signal) sent by the Rx coil 610 to the reset circuit 621 and the power management module 660, and Vint is a signal sent by the reset circuit 621 to the wireless charging circuit 622.

In this embodiment of this application, with reference to the diagram of the waveforms of Vout, Vcoil, and Vint in FIG. 8, a principle in which the glasses case 310 sends the first signal or the second signal to the glasses 210 to charge the glasses 210 and a principle in which the glasses case 310 sends the first signal to the glasses 210, to trigger the processor 630 of the glasses 210 to perform power-on reset are described.

It can be learned from the diagram of the waveform of Vout in FIG. 8 that from a moment $t_1$ to a moment $t_4$, the Tx coil 510 may send the second signal whose duration is 5 s (namely, the second duration) to the Rx coil 610 at an interval of 1 ms (namely, the preset stop duration). In addition, it can be learned from the diagram of the waveform of Vcoil in FIG. 8 that from the moment $t_1$ to the moment $t_4$, the Rx coil 610 may send the second signal whose duration is 5 s (namely, the second duration) to the reset circuit 621 and the power management module 660 at an interval of 1 ms (namely, the preset stop duration). For example, as shown in FIG. 8, Vout and Vcoil are second signals whose duration is 5 s from the moment $t_1$ to a moment $t_2$; and after an interval of 1 ms, Vout and Vcoil are still second signals whose duration is 5 s from a moment $t_3$ to the moment $t_4$.

As shown in FIG. 8, at a moment $t_{11}$ within a period of time from the moment $t_3$ to the moment $t_4$, the glasses case 310 determines that the processor 630 of the glasses 210 needs to perform power-on reset. Starting from the moment $t_4$, after an interval of 1 ms, Vout and Vcoil are first signals whose duration is 10 s from a moment $t_5$ to a moment $t_7$; after an interval of 1 ms, Vout and Vcoil are second signals whose duration is 5 s from a moment $t_8$ to a moment $t_9$; and after an interval of 1 ms, starting from a moment $t_{10}$, Vout and Vcoil are still second signals whose duration is 5 s.

Referring to FIG. 8, with reference to an operating principle of the reset circuit 621, because Vcoil is a second signal whose duration is 5 s from the moment $t_1$ to the moment $t_2$, from the moment $t_3$ to the moment $t_4$, and from the moment $t_8$ to the moment $t_9$, Vint output by the reset circuit 621 to the INT pin is a low level (namely, a first voltage level) whose duration is 5 s from the moment $t_1$ to the moment $t_2$, from the moment $t_3$ to the moment $t_4$, and from the moment $t_8$ to the moment $t_9$. Because Vcoil is a first signal whose duration is 10 s from the moment $t_5$ to the moment $t_7$, Vint output by the reset circuit 621 to the INT pin is a low level (namely, a first voltage level) whose duration is 10 s from the moment $t_5$ to the moment $t_7$.

It should be noted that if the reset circuit 621 does not receive the pulse signal sent by the Rx coil 610, in other words, the reset circuit 621 receives a zero level, the reset circuit 621 may output a second voltage level (for example, a high level) to the control pin (namely, the INT pin) of the wireless charging circuit 622. For example, as shown in FIG. 8, because the reset circuit 622 does not receive the pulse signal from the moment $t_2$ to the moment $t_3$, from the moment $t_4$ to the moment $t_5$, from the moment $t_7$ to the moment $t_8$, and from the moment $t_9$ to the moment $t_{10}$, Vint is a second voltage level (for example, a high level) from the moment $t_2$ to the moment $t_3$, from the moment $t_4$ to the moment $t_5$, from the moment $t_7$ to the moment $t_8$, and from the moment $t_9$ to the moment $t_{10}$. It should be noted that in this embodiment of this application, a solution of this embodiment of this application is described subsequently by using an example in which the first voltage level is a low level and the second voltage level is a high level.

The timer of the wireless charging circuit 622 may start timing from a moment at which a low level is first input into the INT pin after a high level is input into the INT pin, and the timer is reset after it is detected that a level input into the INT pin is a high level. Subsequently, the timer of the wireless charging circuit 622 may cyclically perform the following operation: The timer starts timing from a moment at which a low level is input into the INT pin for a next time, and is reset after a level input into the INT pin is a high level.

In the foregoing timing process, if a timing time of the timer reaches or exceeds the preset duration (for example, 8 s), it indicates that a low level is continuously input into the INT pin of the wireless charging circuit 622 for the preset duration. Therefore, the wireless charging circuit 622 may disconnect the path from the VBAT to the VSYS, so that the power supply pin (for example, the VDD pin) of the processor 630 is powered down.

For example, as shown in FIG. 8, before the moment $t_1$, Vint is a high level (in other words, the high level is input into the INT pin); and at the moment $t_1$, Vint is a low level (in other words, the low level is input into the INT pin). Therefore, the timer of the wireless charging circuit 622 may start timing from the moment $t_1$. Vint is a low level within a period of time from the moment $t_1$ to the moment $t_2$. Therefore, the timer of the wireless charging circuit 622 always times. Until Vint becomes a high level (in other words, the high level is input into the INT pin) at the moment $t_2$, the timer may be reset at the moment $t_2$.

Vint is a high level (in other words, the high level is input into the INT pin) within a period of time from the moment $t_2$ to the moment $t_3$. Until Vint becomes a low level at the moment $t_3$, the timer of the wireless charging circuit 622 may start timing again from the moment $t_3$. Vint is a low level within a period of time from the moment $t_3$ to the moment $t_4$. Therefore, the timer always times. Until Vint becomes a high level at the moment $t_4$, the timer may be reset at the moment $t_4$.

Vint is a high level within a period of time from the moment $t_4$ to the moment $t_5$. Until Vint becomes a low level at the moment $t_5$, the timer of the wireless charging circuit 622 may start timing again from the moment $t_5$. Vint is a low level within a period of time from the moment $t_5$ to the moment $t_7$. Therefore, the timer always times. Until Vint becomes a high level (in other words, the high level is input into the INT pin) at the moment $t_7$, the timer may be reset at the moment $t_7$. Optionally, if the timing time of the timer reaches the preset duration, even if a high level is not input into the INT pin, the timer may also be reset. For example, the timer starts timing from the moment $t_5$, the timing time of the timer reaches the preset duration (for example, 8 s) at a moment $t_6$, and the timer may be reset at the moment $t_6$.

Vint is a high level within a period of time from the moment $t_7$ to the moment $t_8$. Until Vint becomes a low level at the moment $t_8$, the timer of the wireless charging circuit 622 may start timing again from the moment $t_8$. Vint is a low level within a period of time from the moment $t_8$ to the moment $t_9$. Therefore, the timer always times. Until Vint becomes a high level at the moment $t_9$, the timer may be reset at the moment $t_9$. Vint is a high level within a period of time from the moment $t_9$ to the moment $t_{10}$. Until Vint becomes a low level (in other words, a low level may be input into the INT pin) at the moment $t_{10}$, the timer may start timing again from the moment $t_{10}$.

It should be noted that as shown in FIG. 8, Vint is always a low level within a period of time (for example, 8 s, namely, the preset duration) from the moment $t_5$ to the moment $t_6$, and Vint becomes a high level until the moment $t_7$. In other words, a low level is continuously input into the INT pin for the preset duration. Therefore, the wireless charging circuit 622 may disconnect the path from the VBAT to the VSYS at the moment $t_6$ in FIG. 8, so that the power supply pin (for example, the VDD pin) of the processor 630 is powered down.

It can be learned from the foregoing description that, if the wireless charging circuit 622 detects that a high level is input into the INT pin, the path from the VBAT to the VSYS may be connected, to supply power to the VDD pin of the processor 630. For example, the path from the VBAT to the VSYS is disconnected at the moment $t_6$ in FIG. 8, so that the VDD pin of the processor 630 is powered down. As shown in FIG. 8, at the moment $t_7$ after the moment $t_6$, Vint is a high level. Therefore, at the moment $t_7$, the wireless charging circuit 622 may connect the path from the VBAT to the VSYS, to supply power to the VDD pin of the processor 630, so that the processor 630 may perform power-on reset.

In conclusion, in this embodiment of this application, in response to determining that the glasses 210 need to perform power-on reset, the glasses case 310 may send a first signal whose duration is greater than the preset duration to the glasses 210, to trigger the processor 630 of the glasses 210 to perform power-on reset.

Figure 9:
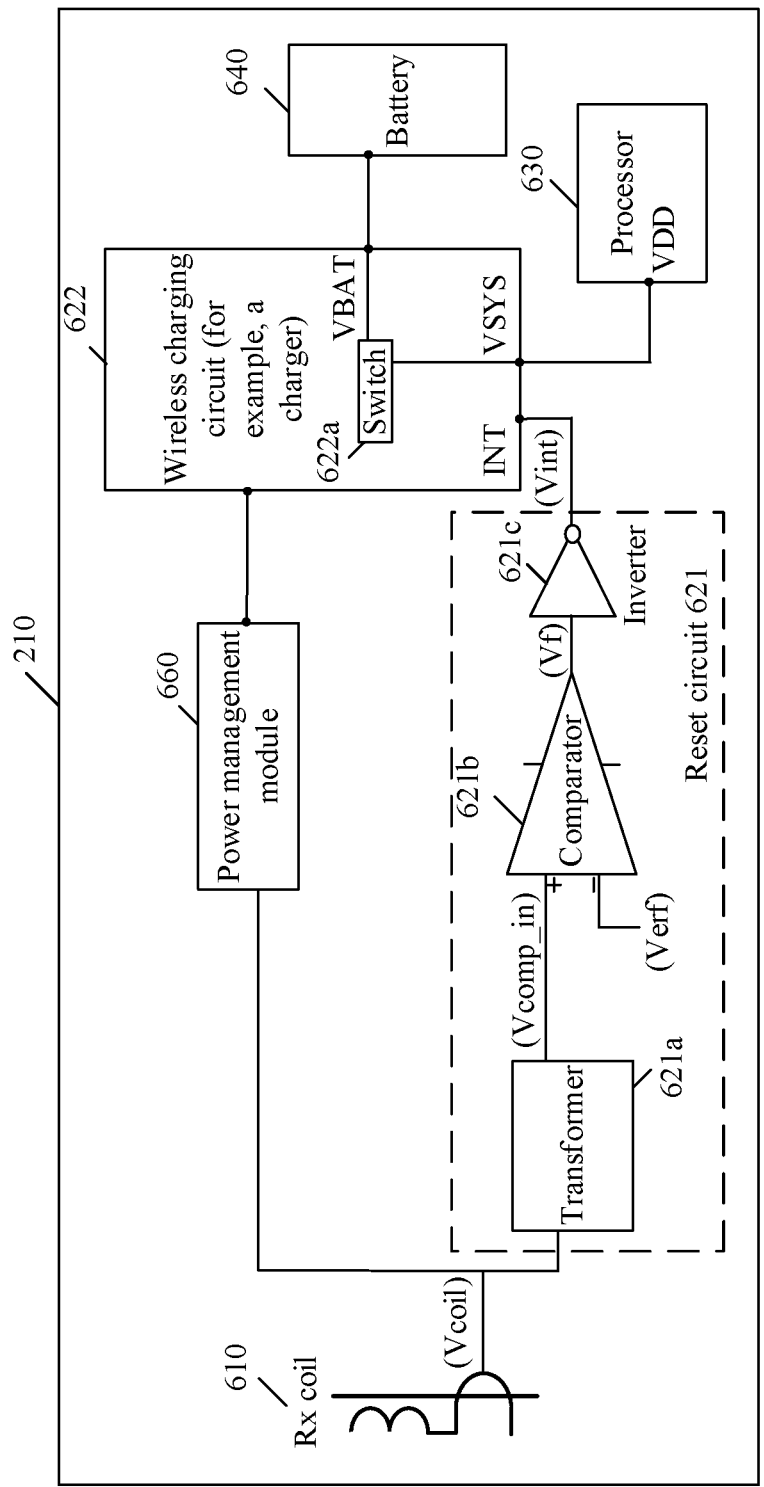
FIG. 9 is a schematic structural diagram of a pair of glasses according to an embodiment of this application.

In some embodiments, as shown in FIG. 9, the reset circuit 621 may include a transformer 621a, a comparator 621b, and an inverter 621c.

An input end of the transformer 621a is the input end of the reset circuit 621. To be specific, the input end of the transformer 621a is connected to the wireless charging receiver circuit (for example, the Rx coil) 610. The transformer 621a is configured to convert a signal (for example, the first signal or the second signal) received by the Rx coil 610 into a direct current electrical signal.

An output end of the transformer 621a is connected to a first input end (for example, a positive polarity input end) of the comparator 621b. A second input end (for example, a negative polarity input end) of the comparator 621b is connected to a reference signal. An output end of the comparator 621b is connected to an input end of the inverter 621c. An output end of the inverter 621c is connected to the control pin (for example, the INT pin) of the wireless charging circuit 622.

The transformer 621a converts the first signal into a first direct current electrical signal in response to the first signal sent by the Rx coil 610, the first direct current electrical signal is greater than the reference signal, the comparator 621b outputs a high level, and the inverter 621c outputs a low level.

It should be noted that, because the duration of the first signal is greater than the preset duration, duration of the first direct current electrical signal is also greater than the preset duration. Therefore, the comparator 621b may continuously output the high level within a period of time greater than the preset duration, so that the inverter 621c continuously outputs the low level within the period of time greater than the preset duration. Therefore, the low level received by the INT pin of the wireless charging circuit 622 lasts for the preset duration, and the wireless charging circuit 622 may disconnect the path from the VBAT to the VSYS, to control the processor 630 to perform power-on reset.

It may be understood that the transformer 621a may also convert the second signal into a second direct current electrical signal in response to the second signal sent by the Rx coil 610, the second direct current electrical signal is greater than the reference signal, the comparator 621b outputs a high level, and the inverter 621c outputs a low level. However, because the duration of the second signal is less than the preset duration, duration of the second direct current electrical signal is also less than the preset duration. Therefore, the comparator 621b may continuously output the high level within a period of time less than the preset duration, so that the inverter 621c continuously outputs the low level within the period of time less than the preset duration. Therefore, the INT pin of the wireless charging circuit 622 does not continuously input a low level for the preset duration, and the wireless charging circuit 622 connects the path from the VBAT to the VSYS without controlling the processor 630 to perform power-on reset.

Figure 10A:
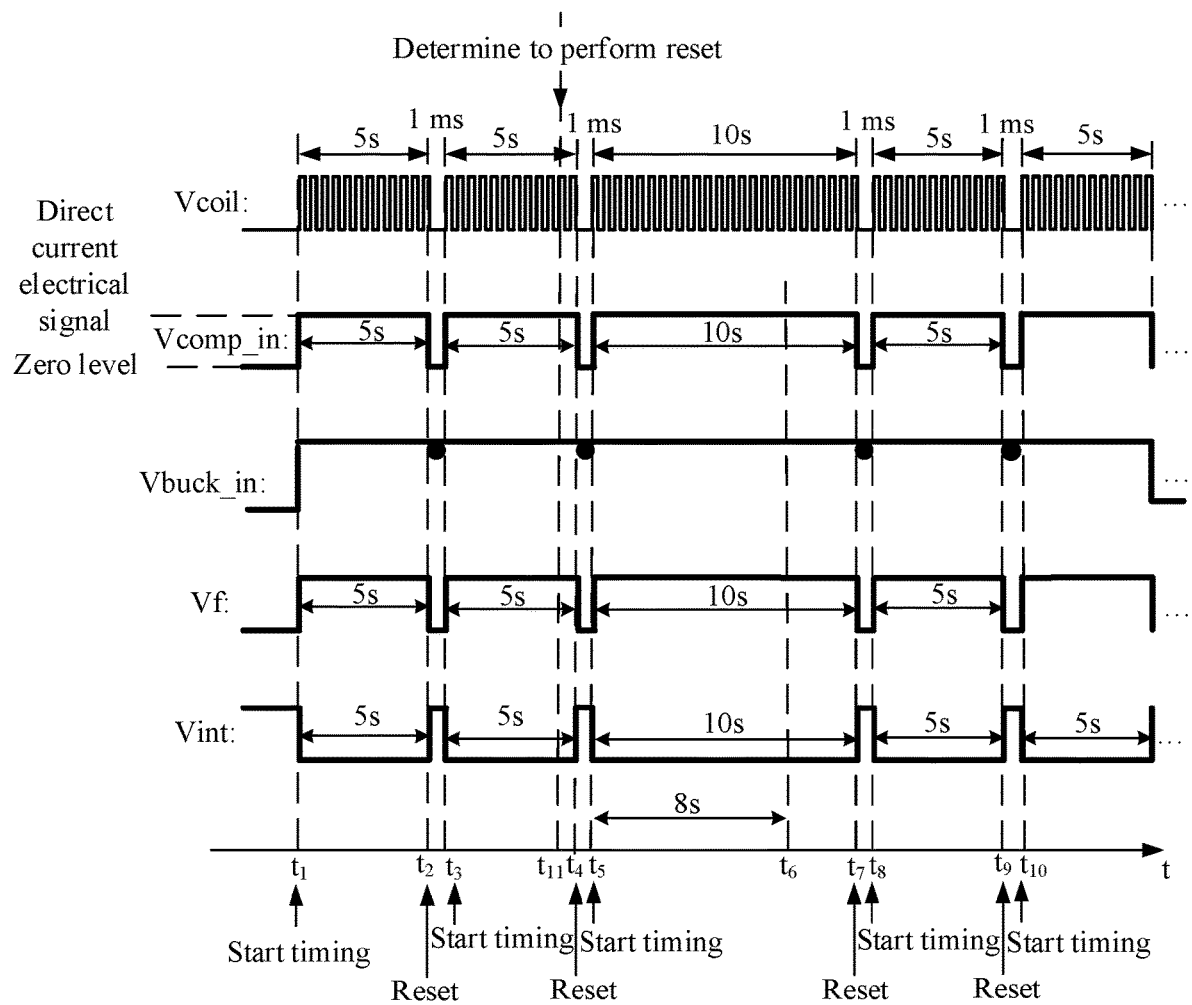
FIG. 10A is a diagram of another signal waveform according to an embodiment of this application.

For example, FIG. 10A is a diagram of waveforms of Vcoil, Vcomp_in, Vf, and Vint. Vcoil is a signal output by the Rx coil 510 to the transformer 621a, Vcomp_in is a signal input by the transformer 621a to the first input end of the comparator 621b, Vf is a signal output by the comparator 621b to the input end of the inverter 621c, and Vint is a signal output by the inverter 621c to the INT pin of the wireless charging circuit 622.

In this embodiment of this application, an operating principle of each device in the reset circuit 621 is described by using the diagram of the waveforms of Vcoil, Vcomp_in, Vf, and Vint in FIG. 10A as an example.

As shown in FIG. 10A, from the moment $t_5$ to the moment $t_7$, Vcoil is a first signal (namely, a pulse signal) whose duration is 10 s; and from the moment $t_1$ to the moment $t_2$, from the moment $t_3$ to the moment $t_4$, and from the moment $t_8$ to the moment $t_9$, Vcoil is a second signal (namely, a pulse signal) whose duration is 5 s. Therefore, from the moment $t_1$ to the moment $t_2$, from the moment $t_3$ to the moment $t_4$, from the moment $t_5$ to the moment $t_7$, and from the moment $t_8$ to the moment $t_9$, Vcomp_in is a direct current electrical signal shown in FIG. 10A. A direct current electrical signal input into the first input end of the comparator 621b is greater than the reference signal input into the second input end. Therefore, from the moment $t_1$ to the moment $t_2$, from the moment $t_3$ to the moment $t_4$, from the moment $t_5$ to the moment $t_7$, and from the moment $t_8$ to the moment $t_9$, Vf is a high level, the inverter 621c may convert the high level into a low level, and Vint is a low level.

From the moment $t_2$ to the moment $t_3$, from the moment $t_4$ to the moment $t_5$, from the moment $t_7$ to the moment $t_8$, and from the moment $t_9$ to the moment $t_{10}$, Vcoil is a zero level (in other words, the transformer 621a does not receive the pulse signal). Therefore, from the moment $t_2$ to the moment $t_3$, from the moment $t_4$ to the moment $t_5$, from the moment $t_7$ to the moment $t_8$, and from the moment $t_9$ to the moment $t_{10}$, Vcomp_in is a zero level shown in FIG. 10A. The zero level input into the first input end of the comparator 621b is less than the reference signal input into the second input end. Therefore, from the moment $t_2$ to the moment $t_3$, from the moment $t_4$ to the moment $t_5$, from the moment $t_7$ to the moment $t_8$, and from the moment $t_9$ to the moment $t_{10}$, Vf is a low level, the inverter 621c may convert the low level into a high level, and Vint is a high level.

It should be noted that for a method in which the wireless charging circuit 622 connects or disconnects the path from the VBAT to the VSYS based on a level input by the inverter 621c to the control pin (for example, the INT pin), refer to a related description in the foregoing embodiment. Details are not described herein in this embodiment of this application.

It may be understood that circuits that implement a specific function of the reset circuit 621 in the foregoing embodiment include but are not limited to the transformer 621a, the comparator 621b, and the inverter 621c in FIG. 9. The reset circuit 621 in this embodiment of this application may be implemented by a plurality of different combinations of one or more devices.

Figure 10B:
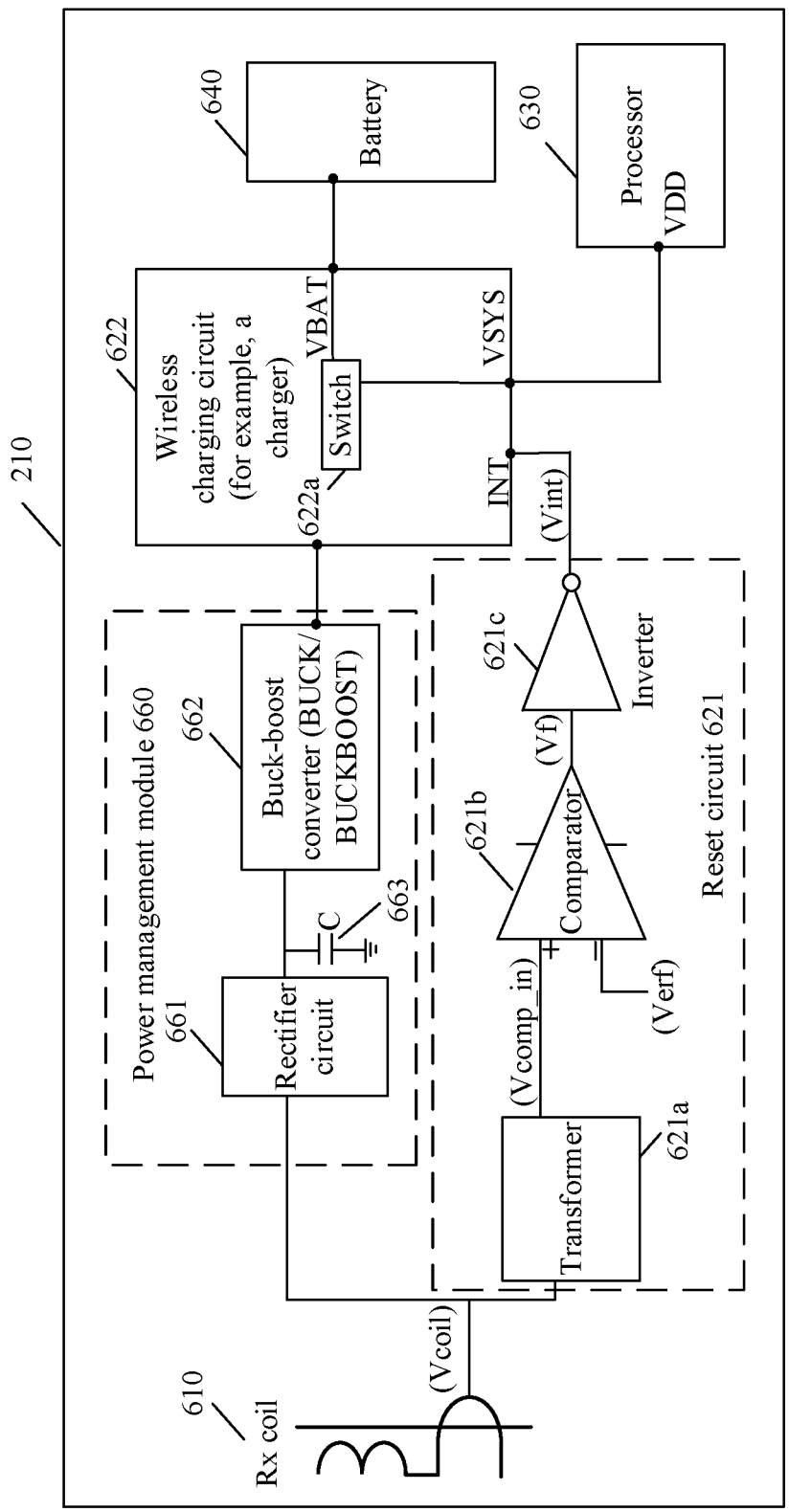
FIG. 10B is a schematic structural diagram of another pair of glasses according to an embodiment of this application.

In some embodiments as shown in FIG. 10B, the power management module 660 may include a rectifier circuit 661 and a buck-boost converter 662.

An input end of the rectifier circuit 661 is an input end of the power management module 660. The input end of the rectifier circuit 661 is connected to the Rx coil 610. An output end of the rectifier circuit 661 is connected to an input end of the buck/buckboost 662. An output end of the buck/buckboost 662 is connected to an input end of the wireless charging circuit (for example, the Charger) 622.

The rectifier circuit 661 is configured to receive a signal (for example, the first signal or the second signal) input by the Rx coil 610, convert the received signal into a direct current electrical signal, and send the direct current electrical signal to the buck/buckboost 662.

The buck/buckboost 662 is configured to process the direct current electrical signal input by the rectifier circuit 661, and send the processed electrical signal to the wireless charging circuit 622. The wireless charging circuit 622 receives the electrical signal input by the buck/buckboost 662, to charge the battery 640. For an operating principle of the buck/buckboost 662, refer to a related description of a conventional technology. Details are not described herein in this embodiment of this application.

Further, as shown in FIG. 10B, the power management module 660 may further include a capacitor C 663. One end of the capacitor C 663 is connected to the output end of the rectifier circuit 661 and the input end of the buck/buckboost 662. The other end of the capacitor C 663 is grounded.

It can be learned from the waveform of Vcoil in FIG. 10A that in a process in which Rx coil 610 inputs a signal to the rectifier circuit 661, there is a zero level whose duration is 1 ms after each second signal whose duration is 5 s or after each first signal whose duration is 10 s. The capacitor C 663 is charged in response to a case in which the rectifier circuit 661 receives the first signal or the second signal. If the rectifier circuit 661 does not receive the pulse signal (for example, the zero level of 1 ms), the capacitor C 663 is discharged. Therefore, even if a signal continuously received by the rectifier circuit 661 for a period of time of 1 ms is a zero level, the rectifier circuit 661 stops sending a direct current electrical signal (denoted as a direct current electrical signal a) to the buck/buckboost 662 within the period of time of 1 ms, and the buck/buckboost 662 may also receive a direct current electrical signal (denoted as a direct current electric signal b) generated when the capacitor C 663 is discharged. Therefore, an electrical signal transmitted by the buck/buckboost 662 to the wireless charging circuit 622 is not interrupted.

It should be noted that within the period of time of 1 ms, although the buck/buckboost 662 may receive the direct current electrical signal b generated when the capacitor C 663 is discharged, the direct current electrical signal b has a voltage sag in comparison to the direct current electrical signal a. In other words, a voltage value of the direct current electrical signal b is k millivolts (mV) less than a voltage value of the direct current electrical signal a. For example, a value range of k may be (1 mV, 100 mV).

For example, FIG. 10A is a diagram of a waveform of Vbuck_in. The Vbuck_in is an electrical signal received by the buck/buckboost 662. For example, in this embodiment of this application, a value range of the direct current electrical signal a may be (5V, 12V).

For example, the direct current electrical signal a equals to 10V. As shown in FIG. 10A, from the moment $t_1$ to the moment $t_2$, from the moment $t_3$ to the moment $t_4$, from the moment $t_5$ to the moment $t_7$, and from the moment $t_8$ to the moment $t_9$, Vbuck_in may be the direct current electrical signal a, namely, 10V However, as shown in FIG. 10A, from the moment $t_2$ to the moment $t_3$, from the moment $t_4$ to the moment t₅, from the moment t₇ to the moment t₈, and from the moment t₉ to the moment t₁₀, Vbuck_in may be the direct current electrical signal b. For example, k=10 mV (namely, 0.01V). As shown in FIG. 10A, from the moment t₂ to the moment t₃, from the moment t₄ to the moment t₅, from the moment t₇ to the moment t₈, and from the moment t₉ to the moment t₁₀, Vbuck_in may be: 10V−0.01V=9.99V As shown in FIG. 10A, a black dot in the waveform of Vbuck_in represents a voltage sag.

It should be noted that in this embodiment of this application, not only the preset stop duration (for example, 1 ms) needs to be greater than or equal to the minimum detection duration of the INT pin of the wireless charging circuit 622, but also the preset stop duration needs to be less than or equal to maximum discharging duration of the capacitor C 663. The maximum discharging duration of the capacitor C 663 is a required period of time from a moment at which the capacitor C 663 starts to be discharged from a full quantity of electric charge to a moment at which a real-time voltage value corresponding to a remaining quantity of electric charge of the capacitor C 663 meets a preset condition.

That the real-time voltage value corresponding to the remaining quantity of electric charge of the capacitor C 663 meets the preset condition may be specifically that the real-time voltage value corresponding to the remaining quantity of electric charge of the capacitor C 663 is equal to a preset percentage of a voltage value of the direct current electrical signal a. For example, the preset percentage is 60%. It is assumed that the voltage value of the direct current electrical signal a is $U_z$, a capacitance value of the capacitor C 663 is $C_c$. The real-time voltage value $$U_s\left(U_s = \frac{Q_s}{C_c}\right)$$

corresponding to the remaining quantity of electric charge $Q_s$ of the capacitor C 663 meets the preset condition, and may be specifically $U_s=60\% \times U_z$. Then, the maximum discharging duration of the capacitor C 663 may be a required period of time from the moment at which the capacitor C 663 starts to be discharged from the full quantity of electric charge to a moment at which the remaining quantity of electric charge of the capacitor C 663 is $Q_s$.

In this embodiment of this application, the capacitor C 663 may be discharged within 1 ms (for example, the preset stop duration) during which the Rx coil 610 inputs the zero level into the rectifier circuit 661. Therefore, Vbuck_in may have only a slight voltage sag at a millisecond voltage level, to ensure that the electrical signal transmitted from the buck/buckboost 662 to the wireless charging circuit 622 is not interrupted, and ensure that the power management module 660 does not intermittently charge the battery 640.

In other words, according to the solution of this embodiment of this application, when it is ensured that, that the glasses case 310 wireless charges the glasses 210 is not affected, the processor 630 may be controlled to automatically perform hardware reset.

Figure 11:
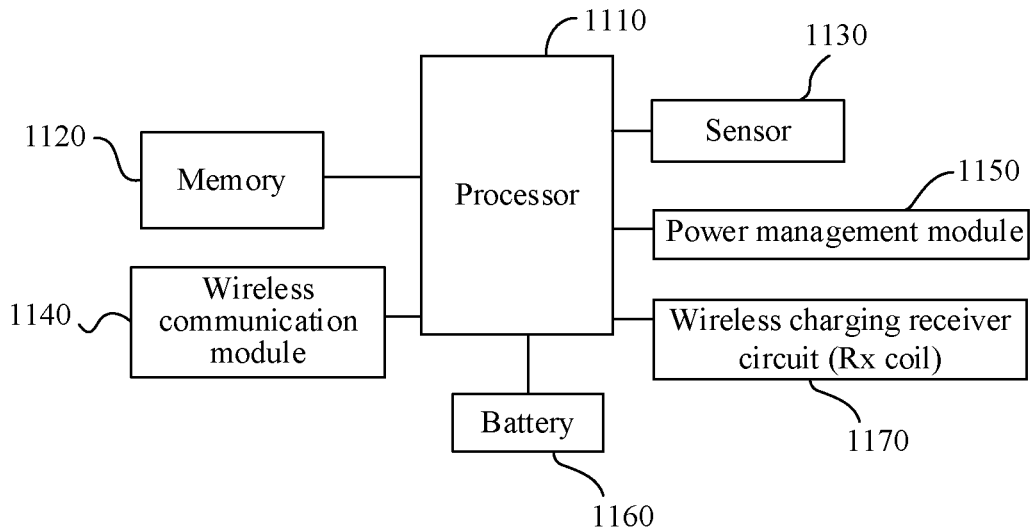
FIG. 11 is a schematic structural diagram of another pair of glasses according to an embodiment of this application.

An embodiment of this application provides glasses 210. As shown in FIG. 11, the glasses 210 may include a processor 1110 (including the processor 630), a memory 1120, a sensor 1130, a wireless communication module 1140 (for example, the transceiver 650), a power management module 1150 (for example, the power management module 660), a battery 1160 (for example, the battery 640), and a wireless charging receiver circuit (for example, the Rx coil 610) 1170. The reset circuit 621 may be included in the processor 1110 shown in FIG. 11. Alternatively, the reset circuit 621 may be disposed outside the processor 1110, and serves a separate circuit module or device (not shown in the accompanying drawings). Both the wireless charging circuit 622 and the Rx coil 610 may be implemented by being integrated in the power management module 1150.

The processor 1110 may include one or more processing units. For example, the processor 1110 may include an AP, a modem processor, a graphics processing unit (GPU), an image signal processor (ISP), a controller, a video codec, a digital signal processor (DSP), a baseband processor, a neural-network processing unit (NPU), and/or the like. Different processing units may be separate devices or may be integrated in one or more processors.

The memory 1120 may be configured to store application code such as application code used to receive a wireless charging input of the glasses case 310 and application code used to establish a wireless connection (for example, a Bluetooth connection) with the glasses case 310. The processor 1110 may control execution of the application code, to implement a function of the glasses 210 in this embodiment of this application.

The memory 1120 may further store a Bluetooth address used to uniquely identify the glasses 210. In addition, the memory 1120 may further store connection data of an electronic device (for example, the glasses case 310) that has been previously successfully paired with the glasses 210. For example, the connection data may be a Bluetooth address of the glasses case 310. Based on the connection data, the glasses 210 can be automatically paired with the glasses case 310 without a need to be configured with a connection with the glasses case 310, for example, performing validity verification. The Bluetooth address may be a media access control (MAC) address.

The power management module 1150 is configured to receive a charging input from a charger. The charger may be a wireless charger or a wired charger. In some wireless charging embodiments, the power management module 1150 may receive the wireless charging input of the glasses case 310 by using the Rx coil. In some wired charging embodiments, the glasses 210 may further include a universal serial bus (USB) interface. The power management module 1150 may receive a charging input of the wired charger through the USB interface. When charging the battery 1160, the power management module 1150 may further supply power to the glasses 210 by using the power management module 1150.

The power management module 1150 is further configured to be connected to the battery 1160 and the processor 1110. The power management module 1150 receives an input of the battery 1160 and supplies power to the processor 1110, the memory 1120, the wireless communication module 1140, and the like. The power management module 1150 may be further configured to monitor parameters such as a battery capacity, a quantity of battery cycles, and a battery health status (for example, leakage or impedance). In some other embodiments, the power management module 1150 may also be disposed in the processor 1110.

The battery 1160 may be configured to supply power to each component included in the glasses 210. In this embodiment of this application, the battery 1160 may be a rechargeable battery.

The wireless communication module 1140 is configured to support short-range data exchange between the glasses 210 and various electronic devices such as the glasses case 310. For example, the wireless communication module 1140 may support wireless communication such as wireless local area network (WLAN) (for example, a Wi-Fi network) communication, Bluetooth (BT) communication, global navigation satellite system (GNSS) communication, frequency modulation (FM) communication, NFC communication, and an infrared (IR) communication. In some embodiments, the wireless communication module 1140 may include a Bluetooth transceiver. The glasses 210 may establish a wireless connection with the glasses case 310 by using the Bluetooth transceiver, to implement the short-range data exchange between the glasses 210 and the glasses case 310.

In some embodiments, the sensor 1130 may include a distance sensor or an optical proximity sensor. The glasses 210 may determine, by using the sensor 1130, whether the glasses 210 are worn by a user. For example, the glasses 210 may detect, by using the optical proximity sensor, whether there is an object near the glasses 210, to determine whether the glasses 210 are worn by the user. In some other embodiments, the glasses 210 may further include a touch sensor, configured to detect a touch operation performed by the user. In some other embodiments, the glasses 210 may further include a fingerprint sensor, configured to detect a user fingerprint, identify a user identity, and the like.

Optionally, the glasses 210 may further include a telephone receiver and a microphone. The telephone receiver, also referred to as "receiver", may be configured to convert an audio electrical signal into a sound signal, and play the sound signal. The microphone, is configured to convert a sound signal into an audio electrical signal.

It may be understood that, a structure illustrated in this embodiment of this application does not constitute a specific limitation on the glasses 210. The glasses 210 may have more or fewer components than those shown in FIG. 11, may combine two or more components, or may have a different component configuration. For example, the glasses 210 may further include a component such as an indicator (which may indicate a status such as a quantity of electric charge of the glasses 210). The various components shown in FIG. 11 may be implemented in hardware, software, or a combination of hardware and software including one or more signal processing or application-specific integrated circuits.

Usually, the glasses 210 are equipped with a glasses case (for example, the glasses case 310 shown in FIG. 3(b)). The glasses case may be configured to accommodate the glasses 210. In addition, the glasses case 310 may further charge the glasses 210.

Figure 12:
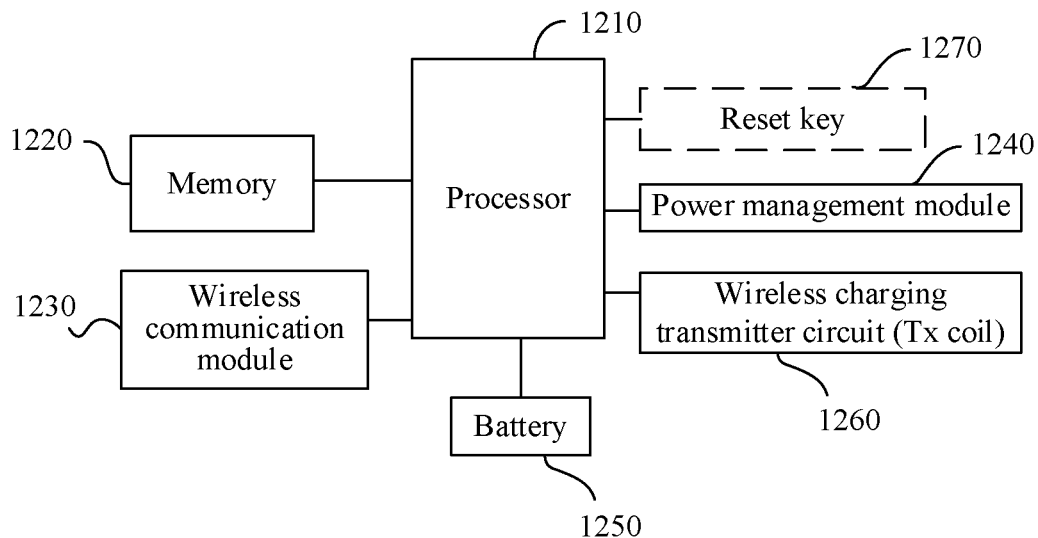
FIG. 12 is a schematic structural diagram of another glasses case according to an embodiment of this application.

An embodiment of this application provides a glasses case 310. As shown in FIG. 12, the glasses case 310 may include a processor 1210 (for example, the processor 520), a memory 1220, a wireless communication module 1230 (for example, the transceiver 560), a power management module 1240 (for example, the power management module 540), and a battery 1250 (for example, the battery 530).

The glasses case 310 may further include an NFC module, namely, an NFC chip (not shown in the accompanying drawings). The NFC chip may be integrated in the processor 1210 or disposed outside the processor 1210. The glasses case 310 may further include an optical proximity sensor, a magnetic sensor (for example, a Hall effect sensor), a sensor (not shown in the accompanying drawings) that detects that the glasses 210 are placed in the glasses case 310, and the like. For a detailed description of sensors such as the optical proximity sensor and the Hall effect sensor, refer to the descriptions in the foregoing embodiments. Details are not described herein in this embodiment of this application.

It should be noted that the NFC module, the optical proximity sensor, the magnetic sensor (for example, the Hall effect sensor), the sensor that detects that the glasses 210 are placed in the glasses case 310, or the like may be configured to implement a function of the distance detection module 550.

The memory 1220 may be configured to store application code such as application code used to establish a wireless connection with the glasses 210 and wirelessly charge the glasses 210. The processor 1210 may control execution of the application code, to implement a function of the glasses case 310 in this embodiment of this application.

The memory 1220 may further store a Bluetooth address used to uniquely identify the glasses case 310, and connection data (for example, a Bluetooth address of the glasses 210) of the glasses 210 that has been previously successfully paired with the glasses case 310. Based on the connection data, the glasses case 310 can be automatically paired with the glasses 210 without a need to be configured with a connection with the glasses 210, for example, performing validity verification. The Bluetooth address may be a MAC address.

The power management module 1240 is configured to receive a charging input from a charger. The charger may be a wired charger. The glasses case 310 may further include a USB interface. The power management module 1240 may receive a charging input of the wired charger through the USB interface. When charging the battery 1250, the power management module 1240 may further supply power to the glasses case 310 by using the power management module 1240.

The power management module 1240 is configured to connect to the battery 1250 and the processor 1210. The power management module 1240 receives an input of the battery 1250, and supplies power to the processor 1210, the memory 1220, the wireless communication module 1230, and the like. The power management module 1240 may be further configured to monitor parameters such as a battery capacity, a quantity of battery cycles, and a battery health status (for example, leakage or impedance). In some other embodiments, the power management module 1240 may also be disposed in the processor 1210.

The battery 1250 may be configured to supply power to each component included in the glasses case 310. In this embodiment of this application, the battery 1250 may be a rechargeable battery.

In this embodiment of this application, the power management module 1240 is further configured to receive the input of the battery 1250, and wirelessly charge the glasses 210 when a distance between the glasses case 310 and the glasses 210 is less than a preset distance threshold. In some embodiments, the power management module 1240 may include a wireless charging coil (for example, the Rx coil shown in FIG. 8). In some other embodiments, the wireless charging coil (for example, the Rx coil shown in FIG. 8) may be disposed outside the power management module 1240 and connected to the power management module 1240. The power management module 1240 may wirelessly charge the glasses 210 by using a wireless charging coil (for example, the Tx coil shown in FIG. 8).

The wireless communication module 1230 is configured to support short-range data exchange between the glasses case 310 and various electronic devices such as the glasses 210. For example, the wireless communication module 1230 may support wireless communication such as WLAN (for example, a Wi-Fi network) communication, BT communication, FM communication, NFC communication, and IR communication. In some embodiments, the wireless communication module 1230 may include a Bluetooth transceiver. The glasses case 310 may establish a wireless connection with the glasses 210 by using the Bluetooth transceiver, to implement the short-range data exchange between the glasses case 310 and the glasses 210.

In some embodiments, after establishing the wireless connection with the glasses 210, the wireless communication module 1230 may receive a reset request message sent by the glasses 210. In response to the reset request message, the glasses case 310 may send the first signal to the glasses 210 by using the wireless charging coil, so that the glasses 210 control a processor of the glasses 210 to perform power-on reset.

In some embodiments, the glasses case 310 may further include a button. The button may be a mechanical button or a touch button. The glasses case 310 may receive a button input and generate a button signal input related to a user setting and functional control that are of the glasses case 310. For example, in this embodiment of this application, the glasses case 310 may include a reset button 1270 in FIG. 12. In response to a tap operation of a user on the reset button 1270, the glasses case 310 may send the first signal to the glasses 210 by using the Tx coil, to control the processor of the glasses 210 to perform power-on reset.

It may be understood that, a structure illustrated in this embodiment of this application does not constitute a specific limitation on the glasses case 310. The glasses case 310 may have more or fewer components than those shown in FIG. 12, may combine two or more components, or may have a different component configuration. For example, the glasses case may further include a component such as an indicator (which may indicate a status such as a quantity of electric charge of the glasses case). The various components shown in FIG. 12 may be implemented in hardware, software, or a combination of hardware and software including one or more signal processing or application-specific integrated circuits.

Another embodiment of this application provides a computer storage medium. The computer storage medium includes computer instructions, and when the computer instructions are run on an electronic device, the electronic device is enabled to perform each function performed by the glasses 210 in the foregoing embodiments.

Another embodiment of this application provides a computer storage medium. The computer storage medium includes computer instructions, and when the computer instructions are run on an electronic device, the electronic device is enabled to perform each function performed by the glasses case 310 in the foregoing embodiments.

Another embodiment of this application provides a computer program product. When the computer program product is run on a computer, the computer is enabled to perform each function performed by the glasses 210 in the foregoing embodiments.

Another embodiment of this application provides a computer program product. When the computer program product is run on a computer, the computer is enabled to perform each function performed by the glasses case 310 in the foregoing embodiments.

The foregoing descriptions about implementations allow a person skilled in the art to clearly understand that, for the purpose of convenient and brief description, division of the foregoing function modules is taken as an example for illustration. In actual application, the foregoing functions can be allocated to different modules and implemented based on a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that, the disclosed system, apparatus, and method may be implemented in other manners. For example, the described apparatus embodiment is merely an example. For example, division into the module or unit is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions in the embodiments essentially, or the part contributing to a conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments. The foregoing storage medium includes: any medium that can store program code, such as a flash memory, a removable hard disk, a read-only memory, a random access memory, a magnetic disk, or an optical disc.

The foregoing descriptions are merely specific implementations of the embodiments, but are not intended to limit the protection scope of the embodiments. Any variation or replacement within the technical scope disclosed in the embodiments shall fall within the protection scope of the embodiments. Therefore, the protection scope of the embodiments shall be subject to the protection scope of the claims.

What is claimed is:

1. A glasses case for glasses, the glasses case comprising:
    a housing, having a cavity configured to accommodate the glasses;
    a processor, configured to determine that the glasses need to perform a power-on reset;
    a wireless charging transmitter circuit, configured to send a first signal to the glasses to perform the power-on reset in response to a determination that the glasses need to perform the power-on reset; and a distance detection circuit configured to determine that a distance between the glasses case and the glasses is less than a preset distance threshold; wherein the wireless charging transmitter circuit is further configured to send the first signal to the glasses in response to a determination that the distance between the glasses case and the glasses is less than the preset distance threshold and the glasses case determines that the glasses need to perform the power-on reset.

2. The glasses case according to claim 1, wherein the glasses case further comprises a button; and the processor determines, based on an input signal received from the button, that the glasses need to perform the power-on reset.

3. The glasses case according to claim 1, wherein the glasses case further comprises a transceiver configured to receive a reset request message sent by the glasses, and the reset request message is used to request to perform the power-on reset on the glasses; and the processor determines, based on the reset request message, that the glasses need to perform the power-on reset.

4. The glasses case according to claim 1, wherein in response to an abnormal or interrupted communication between the glasses case and the glasses, the processor determines that the glasses need to perform the power-on reset.

5. The glasses case according to claim 1, wherein the distance detection circuit includes a near field communication (NFC) module.

6. The glasses case according to claim 1, wherein the distance detection circuit includes an optical proximity sensor.

7. The glasses case according to claim 1, wherein the distance detection circuit includes a Hall effect sensor.

8. The glasses case according to claim 1, wherein the distance detection circuit includes a distance sensor.

9. The glasses case according to claim 1, wherein the distance detection circuit includes a sensor that detects that the glasses are placed in the glasses case; and the distance detection circuit is configured to determine that the distance between the glasses case and the glasses is less than the preset distance threshold based on the glasses being in the glasses case.

10. The glasses case according to claim 1, wherein the wireless charging transmitter circuit is further configured to send a second signal to the glasses to wirelessly charge the glasses, and the second signal is different from the first signal.

11. The glasses case according to claim 10, wherein a duration of the first signal is longer than a duration of the second signal.

12. A pair of glasses comprising:

a wireless charging receiver circuit, a control circuit, and a processor, wherein the wireless charging receiver circuit and the control circuit are electrically connected to the processor;

wherein the wireless charging receiver circuit is configured to receive a first signal sent by a glasses case;

the control circuit is configured to, in response to the first signal, control the processor to perform a power-on reset;

the control circuit comprises a reset circuit and a wireless charging circuit, the reset circuit is electrically connected to the wireless charging receiver circuit, the reset circuit is also electrically connected to the wireless charging circuit, and the wireless charging circuit is electrically connected to the processor;

the reset circuit is configured to send a first voltage level to the wireless charging circuit in response to the first signal; and the wireless charging circuit is configured to, in response to the first voltage level, control the processor to perform the power-on reset.

13. The glasses according to claim 12, wherein a duration of the first signal is greater than a preset duration;

the reset circuit is further configured to continuously send the first signal to the wireless charging circuit within the first duration in response to the first signal; and the wireless charging circuit is further configured to determine that a duration of the received first voltage level equals the preset duration, and in response to determining that the duration of the received first voltage level equals the preset duration, control the processor to perform the power-on reset.

14. The glasses according to claim 12, wherein the reset circuit comprises a transformer, a comparator, and an inverter;

the transformer is connected to the wireless charging receiver circuit, and converts a second signal received by the wireless charging receiver circuit into a direct current electrical signal;

a first input end of the comparator receives the direct current electrical signal, a second input end of the comparator is connected to a reference signal, an output end of the comparator is connected to an input end of the inverter, and an output end of the inverter controls the processor to perform the power-on reset; and in response to the second signal received by the wireless charging receiver circuit being the first signal, the transformer converts the first signal into the direct current electrical signal, the direct current electrical signal is greater than the reference signal, the comparator outputs a high voltage level, the inverter outputs a low voltage level, and the first signal is a low voltage level.

15. The glasses according to claim 12, wherein the wireless charging circuit is electrically connected to the wireless charging receiver circuit;

the wireless charging receiver circuit is further configured to receive a second signal sent by the glasses case;

the wireless charging circuit is further configured to charge a battery of the glasses in response to the first signal or the second signal; and the second signal is different from the first signal, and a duration of the second signal is less than a preset duration.

16. The glasses according to claim 12, wherein the glasses further comprise a transceiver configured to send a reset request message to the glasses case, and the reset request message is used to request the power-on reset.

17. The glasses according to claim 12, wherein the glasses further comprise a near field communication (NFC) module.

18. A wireless charging system comprising:

a glasses case and glasses, wherein the glasses case comprises a housing, having a cavity configured to accommodate the glasses, a first processor, configured to determine that the glasses need to perform a power-on reset, a wireless charging transmitter circuit configured to send a first signal to the glasses to perform power-on reset in response to a determination that the glasses need to perform the power-on reset, and a distance detection circuit configured to determine that a distance between the glasses case and the glasses is less than a preset distance threshold, wherein the wireless charging transmitter circuit is further configured to send the first signal to the glasses in response to a determination that the distance between the glasses case and the glasses is less than the preset distance threshold and the glasses case determines that the glasses need to perform the power-on reset; and the glasses comprise a wireless charging receiver circuit, a control circuit, and a second processor, wherein the wireless charging receiver circuit and the control circuit are electrically connected to the second processor;

the wireless charging receiver circuit is configured to receive the first signal sent by the glasses case; and the control circuit is configured to, in response to the first signal, control the processor to perform the power-on reset.

19. The wireless charging system of claim 18, wherein the glasses case further comprises a transceiver configured to receive a reset request message sent by the glasses, and the reset request message is used to request to perform the power-on reset on the glasses; and the first processor determines, based on the reset request message, that the glasses need to perform the power-on reset.

20. The wireless charging system of claim 18, wherein in response to an abnormal or interrupted communication between the glasses case and the glasses, the first processor determines that the glasses need to perform the power-on reset.

* * * * *

UNITED STATES PATENT AND TRADEMARK OFFICE
CERTIFICATE OF CORRECTION

| | | |
|---|---|---|
| PATENT NO. | : 12,306,400 B2 | Page 1 of 1 |
| APPLICATION NO. | : 17/436318 | |
| DATED | : May 20, 2025 | |
| INVENTOR(S) | : Guoming Zhou et al. | |

It is certified that error appears in the above-identified patent and that said Letters Patent is hereby corrected as shown below:

In the Claims

In Column 28, Claim 18, Line 61, delete "comprises" and insert -- comprises: --, therefor.

Signed and Sealed this
Ninth Day of September, 2025

Coke Morgan Stewart
*Acting Director of the United States Patent and Trademark Office*